United States Patent
Sato et al.

(10) Patent No.: US 12,465,892 B2
(45) Date of Patent: Nov. 11, 2025

(54) METHOD FOR EVALUATING COVERING STATE OF SILICONE COMPOUND

(71) Applicant: TERUMO KABUSHIKI KAISHA, Tokyo (JP)

(72) Inventors: Takeshi Sato, Kanagawa (JP); Renjo Takama, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 295 days.

(21) Appl. No.: 18/239,352

(22) Filed: Aug. 29, 2023

(65) Prior Publication Data

US 2023/0398501 A1 Dec. 14, 2023

Related U.S. Application Data

(63) Continuation of application No. PCT/JP2022/006839, filed on Feb. 21, 2022.

(30) Foreign Application Priority Data

Mar. 4, 2021 (JP) .................................. 2021-034251

(51) Int. Cl.
*B01D 65/10* (2006.01)
*B01D 63/02* (2006.01)

(52) U.S. Cl.
CPC ............ *B01D 65/102* (2013.01); *B01D 63/02* (2013.01)

(58) Field of Classification Search
CPC .................................................. B01D 65/102
See application file for complete search history.

(56) References Cited

U.S. PATENT DOCUMENTS

| 1,075,657 A | 10/1913 | Krompigel et al. |
| 5,298,255 A | 3/1994 | Sawamoto et al. |
| 2015/0013137 A1* | 1/2015 | Olsen .................. A61M 1/3623 |
| | | 29/428 |
| 2023/0001358 A1 | 1/2023 | Sato et al. |

FOREIGN PATENT DOCUMENTS

| JP | S5739851 A | 3/1982 |
| JP | S63154180 A | 6/1988 |
| JP | H04152952 A | 5/1992 |

(Continued)

OTHER PUBLICATIONS

International Search Report, PCT/JP2022/006839, Apr. 7, 2022.
International Search Opinion, PCT/JP2022/006839, Apr. 26, 2023.

*Primary Examiner* — Stephanie E Bloss
*Assistant Examiner* — Diana Hancock
(74) *Attorney, Agent, or Firm* — MacMillan, Sobanski & Todd, LLC

(57) ABSTRACT

A covering state of a coating layer containing a silicone compound on an inner surface of hollow fiber membranes is evaluated by dissolving the silicone compound and a dyeing agent in an organic solvent and causing the coating solution to pass through the hollow fiber membranes. The covering state of the silicone compound or a crosslinked product is determined by observing a dyed state of a hollow fiber membrane end surface on a coating solution passing start side and a dyed state of a hollow fiber membrane end surface on a coating solution passing end side of the hollow fiber membrane on which the coating layer is formed.

15 Claims, 8 Drawing Sheets

(56) References Cited

FOREIGN PATENT DOCUMENTS

| | | | |
|---|---|---|---|
| JP | 2009125600 A | 6/2009 | |
| JP | 2018149270 A | 9/2018 | |
| JP | 2021142163 A | 9/2021 | |
| KR | 20110066376 A | 6/2011 | |
| WO | WO-2012147850 A1 * | 11/2012 | ............. B01D 63/02 |
| WO | WO-2021076437 A1 * | 4/2021 | .......... A61M 1/1698 |

* cited by examiner

HOLLOW FIBER MEMBRANE (1) (EXAMPLE 1)

HOLLOW FIBER MEMBRANE (3) (COMPARATIVE EXAMPLE 1)

METHOD FOR EVALUATING COVERING STATE OF SILICONE COMPOUND

CROSS REFERENCE TO RELATED APPLICATIONS

This application is a continuation of PCT Application No. PCT/JP2022/006839, filed Feb. 21, 2022, based on and claiming priority to Japanese Application No. JP2021-034251, filed Mar. 4, 2021, both of which are incorporated herein by reference in their entirety.

BACKGROUND OF THE INVENTION

The present invention relates to a method for evaluating a covering state of a silicone compound on a porous hollow fiber membrane.

An oxygenator having a porous hollow fiber membrane may have a decrease in a gas exchange performance with long-term use. Wet lung and blood plasma leakage are main factors thereof. For wet lung, it is possible to recover the gas exchange performance by blowing air at a high pressure and removing dew condensation water from the hollow fiber membrane. Meanwhile, the blood plasma leakage causes an irreversible decrease in a performance of the oxygenator. It is required to find a solution to a problem caused by the blood plasma leakage in the long-term use of the oxygenator, and many studies have been made so far. Among these, as a method for improving blood plasma leakage resistance, a method is adopted in which a micropore present in a hollow fiber membrane is closed or the micropore in the hollow fiber membrane is made extremely minute.

For example, Japanese Patent Application JP2002-035116A discloses that by applying silicone coating to an outer surface of a porous hollow fiber membrane made of a polypropylene, blood plasma leakage is less likely to occur and long-term use is possible.

However, according to a method described in JP2002-035116A, the silicone coating is performed by moving a continuous line of the hollow fiber membrane at a rate of 0.5 m/min to 50 m/min in a silicone monomer gas during blood plasma discharge in a high vacuum to polymerize a silicone monomer on the outer surface of the hollow fiber membrane. Therefore, there is a problem that a coating step requires intricate equipment and a long periods of time.

For a purpose of providing an oxygenator having blood plasma leakage resistance by a simpler method, studies have been conducted on a method of forming a coating layer containing a silicone compound or the like on an inner surface of a hollow fiber membrane (for example, U.S. Patent Application Publication US2023/0001358A1). In the above studies, a method capable of easily evaluating a formation state (covering degree) of a coating layer containing a silicone compound or the like on an inner surface of a hollow fiber membrane is required.

SUMMARY OF THE INVENTION

Therefore, an object of the invention is to provide a method capable of easily evaluating a formation state of a coating layer containing a silicone compound or the like on an inner surface of a hollow fiber membrane.

The present inventors have found that the above problem can be solved by observing a hollow fiber membrane end surface after a coating solution containing a silicone compound and a dyeing agent is brought into contact with an inner surface of a hollow fiber membrane.

That is, the above object can be achieved by a method for evaluating a covering state of a silicone compound, the method including: dissolving a silicone compound and a dyeing agent in an organic solvent to prepare a coating solution; causing the coating solution to pass through an inner surface of a hollow fiber membrane to form a coating layer containing the silicone compound and/or a crosslinked product of the silicone compound and the dyeing agent on the inner surface; and evaluating a covering state of the silicone compound/the crosslinked product by observing a dyed state of a hollow fiber membrane end surface on a coating solution passing start side and a dyed state of a hollow fiber membrane end surface on a coating solution passing end side of the hollow fiber membrane on which the coating layer is formed.

DETAILED DESCRIPTION OF PREFERRED EMBODIMENTS

Figure 1:
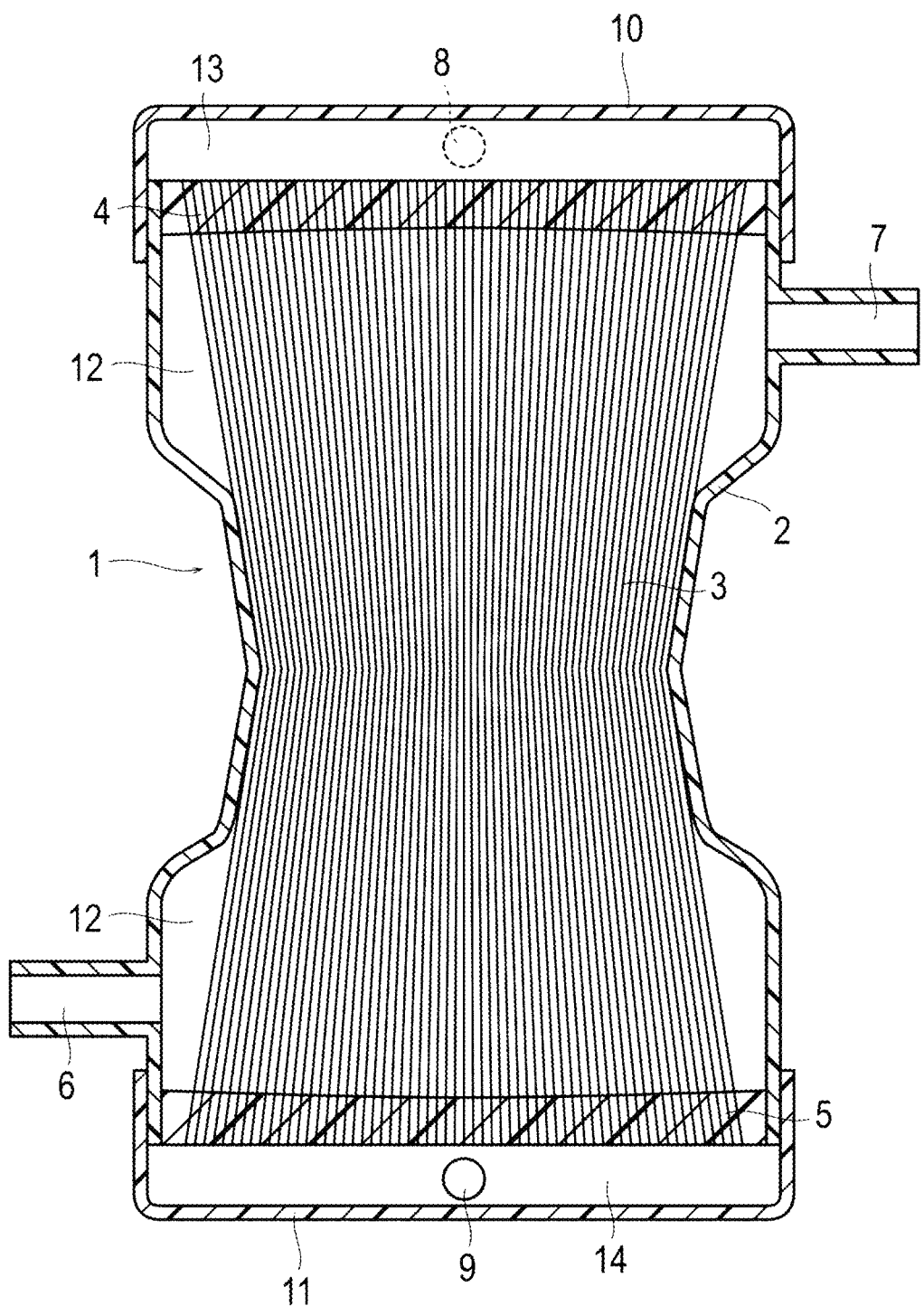
FIG. 1 is a cross-sectional view of a hollow fiber membrane external perfusion type oxygenator according to an embodiment of the invention.

The invention relates to a method for evaluating a covering state of a silicone compound, the method including: dissolving a silicone compound and a dyeing agent in an organic solvent to prepare a coating solution; causing the coating solution to pass through an inner surface of a hollow fiber membrane to form a coating layer containing the silicone compound and/or a crosslinked product of the silicone compound and the dyeing agent on the inner surface; and evaluating a covering state of the silicone compound/the crosslinked product by observing a dyed state of a hollow fiber membrane end surface 1 on a coating solution passing start side and a dyed state of a hollow fiber membrane end surface 2 on a coating solution passing end side of the hollow fiber membrane on which the coating layer is formed. According to the invention, a formation state of the coating layer containing the silicone compound or the like on the inner surface of the hollow fiber membrane can be easily evaluated. In the present specification, "the silicone compound and/or a crosslinked product of the silicone compound" is also collectively referred to as "the silicone compound/a crosslinked product" or "the silicone compound or the like".

In studies on a method for forming a coating layer containing a silicone compound or the like on an inner surface of a hollow fiber membrane (for example, U.S. Patent Application Publication US2023/0001358A1), the present inventors have identified a need for a method for evaluating whether the coating layer containing the silicone compound or the like can be formed over an entire lumen (i.e., inner surface) of the hollow fiber membrane. Therefore, the present inventors have conducted intensive studies on a method capable of easily evaluating the formation state of the coating layer containing the silicone compound or the like (a covering state of the silicone compound/the crosslinked product) on the inner surface of the hollow fiber membrane. As a result, it has been found that the formation state of the coating layer (the covering state of the silicone compound or the like) can be evaluated by adding a dyeing agent to the coating solution containing the silicone compound, passing the obtained mixture through the lumen of the hollow fiber membrane, and observing the dyed states of the hollow fiber membrane end surfaces on a coating solution passing start side and a coating solution passing end side (for example, calculating a ratio of the number of hollow fiber membranes within a bundle of a plurality of hollow fiber membranes which are dyed on the coating solution passing end side to the number of hollow fiber membranes dyed on the coating solution passing start side). Specifically, when a solution containing the silicone compound and the dyeing agent passes through the lumen of the hollow fiber membrane, the silicone compound and the dyeing agent pass through the lumen of the hollow fiber membrane in substantially the same manner. Therefore, the number of hollow fiber membranes dyed on the coating solution passing start side corresponds to the number of all the hollow fiber membranes, and when the hollow fiber membrane end surface 2 on the coating solution passing end side is dyed, it can be considered that the silicone compound or the like also passes to the hollow fiber membrane end surface. Hence, according to the method of the invention, it is possible to easily evaluate whether the coating layer containing the silicone compound or the like can be formed over the entire lumen of the hollow fiber membrane according to presence or absence of dyeing on both hollow fiber membrane end surfaces (for example, the ratio of the number of the hollow fiber membranes dyed on the coating solution passing end side to the number of the hollow fiber membranes dyed on the coating solution passing start side).

Hereinafter, preferred embodiments of the invention will be described. The invention is not limited to the following embodiments, and various modifications can be made within a scope of the claims. Throughout the entire specification, a singular expression should be understood as encompassing a concept thereof in a plural form unless otherwise specified. Therefore, a singular article (for example, "a", "an", and "the" in English) also should be understood as encompassing a concept thereof in a plural form unless otherwise specified. Terms used in the present specification should be understood to be used in a meaning generally used in the field unless otherwise specified. Therefore, unless otherwise specified, all technical terms and scientific technical terms used in the present specification have meanings same as those generally understood by a person skilled in the art in the field to which the invention belongs. If there is a conflict, the present specification (including definitions) takes precedence. Dimensional ratios in the drawings are exaggerated for convenience of description and may differ from actual ratios.

In the present specification, "X to Y" indicating a range includes X and Y, and means "X or more and Y or less". Unless otherwise specified, an operation and measurement for physical properties and the like are performed under a condition of room temperature (20° C. to 25° C.) and a relative humidity of 40% to 50% RH. "A and/or B" means both A and B, or either A or B.

Hereinafter, the method for evaluating the covering state of the silicone compound according to the invention will be described in detail.

The method for evaluating the covering state of the silicone compound according to the invention includes:
  (i) dissolving a silicone compound and a dyeing agent in an organic solvent to prepare a coating solution (step (i));
  (ii) causing the coating solution to pass through an inner surface of a hollow fiber membrane to form a coating layer containing the silicone compound and/or a crosslinked product of the silicone compound and the dyeing agent on the inner surface (step (ii)); and
  (iii) evaluating a covering state of the silicone compound/the crosslinked product by observing a dyed state of a hollow fiber membrane end surface 1 on a coating solution passing start side and a dyed state of a hollow fiber membrane end surface 2 on a coating solution passing end side of the hollow fiber membrane on which the coating layer is formed (step (iii)).

[Step (i)]

In the step (i), the silicone compound and the dyeing agent are dissolved in the organic solvent to prepare the coating solution. In the present specification, the coating layer containing the silicone compound or the like (a coat made of the silicone compound or the like) has a function of reducing leakage of blood plasma from an outer surface side to an inner surface side of the hollow fiber membrane (blood plasma leakage resistance). In a hollow fiber membrane type oxygenator, there may be a problem that a gas exchange performance is reduced by a phenomenon called wet lung, that is, moisture vaporized from blood is stored in a lumen of the hollow fiber membrane, and the silicone compound also has a function of reducing the wet lung.

The silicone compound is not particularly limited as long as it is a polymer compound having a siloxane bond (Si—O—Si) in a main skeleton. Among these, the silicone compound is preferably a silicone compound represented by the following Formula (1) because a coating layer providing excellent blood plasma leakage resistance can be formed. That is, according to a preferred embodiment of the invention, the silicone compound is represented by the following Formula (1).

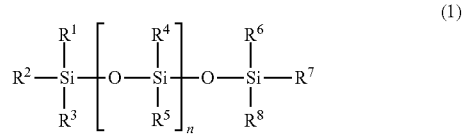

In the above Formula (1), $R^1$ to $R^8$ each independently represent an alkyl group having one or more and six or less carbon atoms, an aromatic hydrocarbon group having six or more and thirty or less carbon atoms, or a reactive group selected from the group consisting of an ethylenically unsaturated bond-containing group having one or more and six or less carbon atoms, an amino group-containing group, a hydroxy group-containing group, a carboxy group-containing group, a maleimide group-containing group, a thiol group-containing group, and a halogen group.

In the above Formula (1), n is one or more and 100,000 or less.

In the silicone compound represented by the above Formula (1), all of $R^1$ to $R^8$ may be each independently an alkyl group having one or more and six or less carbon atoms or an aromatic hydrocarbon group having six or more and thirty or less carbon atoms, and it is preferable that at least one of $R^1$ to $R^8$ is a reactive group selected from the group consisting of an ethylenically unsaturated bond-containing group having one or more and six or less carbon atoms, an amino group-containing group, a hydroxy group-containing group, a carboxy group-containing group, a maleimide group-containing group, a thiol group-containing group, and a halogen group. More preferably, at least one of $R^1$ to $R^3$ and at least one of $R^6$ to $R^8$ each independently represent a reactive group selected from the group consisting of an ethylenically unsaturated bond-containing group having one or more and six or less carbon atoms, an amino group-containing group, a hydroxy group-containing group, a carboxy group-containing group, a maleimide group-containing group, a thiol group-containing group, and a halogen group, and the rest of $R^1$ to $R^3$, $R^4$, $R^5$, and the rest of $R^6$ to $R^8$ each independently represent an alkyl group having one or more and six or less carbon atoms or an aromatic hydrocarbon group having six or more and thirty or less carbon atoms. Still more preferably, one of $R^1$ to $R^3$ and one of $R^6$ to $R^8$ each independently represent a reactive group selected from the group consisting of an ethylenically unsaturated bond-containing group having one or more and six or less carbon atoms, an amino group-containing group, a hydroxy group-containing group, a carboxy group-containing group, a maleimide group-containing group, a thiol group-containing group, and a halogen group, and the rest two of $R^1$ to $R^3$, $R^4$, $R^5$, and the rest two of $R^6$ to $R^8$ each independently represent an alkyl group having one or more and six or less carbon atoms or an aromatic hydrocarbon group having six or more and thirty or less carbon atoms. Since the silicone compound represented by Formula (1) has a reactive group, a crosslinking reaction proceeds in the process of forming the coating layer (for example, in the process of drying the organic solvent), which leads to generation of a crosslinked product of the silicone compound. Accordingly, adhesion and durability of the coating layer can be improved.

When the silicone compound (preferably the silicone compound represented by Formula (1)) used for preparing the coating solution does not have a reactive group, the silicone compound may be contained in the coating layer formed on the inner surface of the hollow fiber membrane as it is. On the other hand, when the silicone compound (preferably the silicone compound represented by Formula (1)) used for preparing the coating solution has a reactive group as described above, the coating layer formed on the inner surface of the hollow fiber membrane may contain the silicone compound (that is, an uncrosslinked silicone compound) used for preparing the coating solution and/or the crosslinked product of the silicone compound. That is, the coating layer formed on the inner surface of the hollow fiber membrane may contain the silicone compound used for preparing the coating solution and/or the crosslinked product of the silicone compound.

Examples of the alkyl group having one or more and six or less carbon atoms or the aromatic hydrocarbon group having six or more and thirty or less carbon atoms in Formula (1) include a methyl group, an ethyl group, an n-propyl group, a phenyl group, and groups derived from fluorescein and a derivative thereof. Here, examples of the derivative of fluorescein include fluorescein isothiocyanate, N-hydroxysuccinimide fluorescein, Oregon Green, Tokyo Green, SNAFL, carboxyfluorescein, carboxyfluorescein diacetate, and aminofluorescein. Among these, a methyl group and an ethyl group are preferable, and a methyl group is more preferable from viewpoints of fluidity and a Young's modulus after curing. Examples of the ethylenically unsaturated bond-containing group having one or more and six or less carbon atoms include a vinyl group, a vinyloxy group, an allyl group, an allyloxy group, a propenyl group, and a propenyloxy group. Examples of a functional group containing an amino group (amino group-containing group) include an amino group and an aminophenyl group. Examples of a functional group containing a hydroxy group (hydroxy group-containing group) include a hydroxy group, a phenol group, and a catechol group. Examples of a functional group containing a carboxy group (carboxy group-containing group) include a carboxy group and a maleic acid group. Examples of a functional group containing a maleimide group (maleimide group-containing group) include a maleimide group. Examples of a functional group containing a thiol group (thiol group-containing group) include a thiol group, a thiophenyl group, and a thiophenol group. Examples of the halogen group include a fluoro group, a chloro group, a bromo group, and an iodo group. Among these, since crosslinking reactivity is good, a vinyloxy group ($—O—CH=CH_2$), an allyloxy group ($—O—CH_2CH=CH_2$), and an allyl group ($—CH_2CH=CH_2$) are preferable, and a vinyloxy group is more preferable.

In one embodiment of the invention, the silicone compound is a silicone compound represented by Formula (1) in which at least one of $R^1$ to $R^3$ and at least one of $R^6$ to $R^8$ are each independently a vinyloxy group ($—O—CH=CH_2$), an allyloxy group ($—O—CH_2CH=CH_2$), or an allyl group, and the rest of $R^1$ to $R^3$, $R^4$, $R^5$, and the rest of $R^6$ to $R^8$ are each independently a methyl group or an ethyl group.

In one embodiment of the invention, the silicone compound is a silicone compound represented by Formula (1) in which one of $R^1$ to $R^3$ and one of $R^6$ to $R^8$ are each independently a vinyloxy group ($—O—CH=CH_2$), an allyloxy group ($—O—CH_2CH=CH_2$), or an allyl group, and the rest two of $R^1$ to $R^3$, $R^4$, $R^5$, and the rest two of $R^6$ to $R^8$ are each independently a methyl group or an ethyl group.

In one embodiment of the invention, the silicone compound is a silicone compound represented by Formula (1) in which one of $R^1$ to $R^3$ and one of $R^6$ to $R^8$ are vinyloxy groups ($—O—CH=CH_2$) and the rest two of $R^1$ to $R^3$, $R^4$, $R^5$, and the rest two of $R^6$ to $R^8$ are methyl groups.

n in Formula (1) is not particularly limited, and is preferably one or more and 100,000 or less, and more preferably one or more and 10,000 or less. When n falls within the above range, it is possible to cause the coating solution to easily pass through the lumen of the hollow fiber membrane.

The silicone compound may be either a commercial product or a synthetic product. Examples of the commercial product include SYLGARD (registered trademark) 184 and 186 manufactured by Dow Corning Corporation.

One kind of the silicone compound may be used alone or two or more kinds may be used in combination.

A concentration of the silicone compound in the coating solution is not particularly limited, and is preferably 10 mg/mL or more and less than 800 mg/mL, more preferably 20 mg/mL to 400 mg/mL, and particularly preferably 100 mg/mL to 300 mg/mL, from a viewpoint of improving fluidity of the coating solution in the lumen of the hollow fiber membrane. When the coating layer is formed by one execution of a coating solution application step, the concentration is preferably 100 mg/mL to 400 mg/mL, more preferably 100 mg/mL to 300 mg/mL, and particularly preferably 100 mg/mL or more and less than 200 mg/mL from a viewpoint of forming the coating layer having a sufficient thickness. When the coating layer is formed by a plurality of repetitions of the coating solution application step, since the coating layer having a sufficient thickness can be formed even though the concentration is lower, the concentration is preferably 10 mg/mL or more and less than 100 mg/mL, and more preferably 20 mg/mL to 70 mg/mL. When two or more kinds of the silicone compounds are used, the concentration of the silicone compounds means a total concentration of the silicone compounds used.

The dyeing agent is not particularly limited as long as it can dye the hollow fiber membrane. Specifically, examples of the dyeing agent include a Rhodamine-based dyeing agent (for example, Rhodamine B, Rhodamine 6G, Rhodamine 6GP, Rhodamine 3GO, and Rhodamine 123), a fluorescein-based dyeing agent (for example, fluorescein and a derivative thereof such as fluorescein, fluorescein isothiocyanate, N-hydroxysuccinimide fluorescein, Oregon Green, Tokyo Green, SNAFL, carboxyfluorescein, carboxyfluorescein diacetate, and aminofluorescein), Indocyanine Green, and a polymer having these molecules in at least one of a side chain and a terminal. Among these, from a viewpoint of a dyeing property and visibility of the hollow fiber membrane, availability, and the like, Rhodamine B, Rhodamine 6G, Rhodamine 6GP, Rhodamine 3GO, Rhodamine 123, fluorescein and a derivative thereof, and a polymer having these molecules in at least one of the side chain and the terminal are preferably used, and Rhodamine B is more preferably used. That is, according to a preferred embodiment of the invention, the dyeing agent is selected from Rhodamine B, Rhodamine 6G, Rhodamine 6GP, Rhodamine 3GO, Rhodamine 123, fluorescein and a derivative thereof, and a polymer having these molecules in at least one of the side chain and the terminal. In a more preferred embodiment of the invention, the dyeing agent is selected from Rhodamine B, Rhodamine 6G, Rhodamine 6GP, Rhodamine 3GO, and Rhodamine 123. In a still more preferred embodiment of the invention, the dyeing agent is Rhodamine B.

The dyeing agent may be either a commercially available product or a synthetic product.

One kind of the dyeing agents may be used alone or two or more kinds may be used in combination.

A concentration of the dyeing agent in the coating solution is not particularly limited, and is preferably 0.025 mg/mL to 0.5 mg/mL, and more preferably 0.05 mg/mL to 0.1 mg/mL, from a viewpoint of a dyeing degree (visibility) of the hollow fiber membrane. When two or more kinds of the dyeing agents are used, the concentration of the dyeing agents means a total concentration of the dyeing agents used.

The organic solvent is used for a purpose of dispersing or dissolving the silicone compound and the dyeing agent. In the method according to the present embodiment, the organic solvent is not particularly limited as long as the above purpose can be achieved, and a surface tension thereof is preferably less than 70 dyn/cm. That is, according to a preferred embodiment of the invention, the surface tension of the organic solvent is less than 70 dyn/cm. When the surface tension of the organic solvent is less than 70 dyn/cm, the silicone compound is more easily dissolved and the coating solution passing can be easy, and thus the coating layer can be favorably formed (as a uniform coating film). From a viewpoint of further improving solubility of the silicone compound and the fluidity of the coating solution in the lumen of the hollow fiber membrane, the surface tension of the organic solvent is preferably 50 dyn/cm or less, more preferably 40 dyn/cm or less, and still more preferably 30 dyn/cm or less. A lower limit of the surface tension is not particularly limited, and is preferably 15 dyn/cm from a viewpoint of causing the coating solution to flow in the hollow fiber membrane without any problem and a viewpoint of preventing the coating solution from passing through a pore in the hollow fiber membrane. A numerical value range of the surface tension of the organic solvent is preferably 15 dyn/cm or more and less than 70 dyn/cm, more preferably 15 dyn/cm or more and 50 dyn/cm or less, still more preferably 15 dyn/cm or more and 40 dyn/cm or less, and particularly preferably 15 dyn/cm or more and 30 dyn/cm or less. Note that 1 dyn/cm is 0.001 N/m.

In the present specification, the surface tension of the organic solvent (when two or more kinds of organic solvents are mixed and used, a surface tension of a mixed organic solvent) is measured at 20° C. using a Du Nuoy surface tensiometer (manufactured by Ito Seisakusho Co., Ltd.). Specifically, a platinum ring is hung on a tip of a thin rod attached to a center of a steel wire and is brought into contact with a surface of an organic solvent at a horizontal position. The steel wire is twisted by turning a knob to pull up the platinum ring. A value at a moment when the platinum ring separates from the solvent surface is read with a scale plate and a pointer, and the value is taken as the surface tension (dyn/cm) of the organic solvent.

Examples of the organic solvent include an aromatic hydrocarbon such as toluene (28.5 dyn/cm) and xylene (28.4 dyn/cm), cyclohexane (25.3 dyn/cm), n-hexane (18.4 dyn/cm), n-heptane (20.1 dyn/cm), diethyl ether (16.96 dyn/cm), diisopropyl ether (17.1 dyn/cm), methyl hexyl ether (23.5 dyn/cm), ethyl acetate (24.0 dyn/cm), butyl acetate (25.2 dyn/cm), isopropyl laurate (30.1 dyn/cm), isopropyl myristate (28.3 dyn/cm), methyl ethyl ketone (24.6 dyn/cm), methyl isobutyl ketone (23.9 dyn/cm), lauryl alcohol (24.0 dyn/cm), acetone (23.3 dyn/cm), butyl alcohol (25.4 dyn/cm), 1-propanol (23.7 dyn/cm), isopropanol (23.0 dyn/cm), 2-ethylhexanol (26.9 dyn/cm), chloroform (26.7 dyn/cm), and a fluorine-based solvent such as hydrofluoroether (13.6 dyn/cm), hydrofluoroolefin (17.9 dyn/cm), hydrofluorocarbon (13.6 dyn/cm), hydrochlorofluoroolefin (14.6 dyn/cm), and hydrochlorofluorocarbon (12.7 dyn/cm). Among these, from a viewpoint that the silicone compound and the dyeing agent (in particular, the silicone compound) can be satisfactorily dissolved and a viewpoint that the organic solvent can be easily removed at a low boiling point, n-hexane, cyclohexane, acetone, butyl alcohol, 1-propanol, isopropanol, chloroform, diethyl ether, an aromatic hydrocarbon, and a fluorine-based solvent are preferable, and n-hexane and acetone are more preferable. One kind of these solvents may be used alone or two or more kinds may be used in combination. That is, according to a preferred embodiment of the invention, the organic solvent is at least one selected from the group consisting of n-hexane, cyclohexane, acetone, butyl alcohol, 1-propanol, isopropanol, chloroform, diethyl ether, an aromatic hydrocarbon, and a fluorine-based solvent. That is, according to a more preferred embodiment of the invention, the organic solvent is n-hexane, acetone, or a combination of n-hexane and acetone. As long as a surface tension of a solvent for dissolving the silicone compound is less than 70 dyn/cm, an organic solvent having a surface tension of 70 dyn/cm or more may be contained.

The coating solution may contain an additive as necessary in addition to the above silicone compound and organic solvent. Examples of the additive include carnauba wax, PDMS-PEG, and a crosslinker.

In the step, the order of mixing the silicone compound, the dyeing agent, and the organic solvent is not particularly limited. The silicone compound and the dyeing agent may be collectively added to the organic solvent. The silicone compound and the dyeing agent may be separately added to the organic solvent in any order (in the order of first adding the silicone compound and then adding the dyeing agent, or first adding the dyeing agent and then adding the silicone compound). The silicone compound and the dyeing agent may be added in different organic solvents, followed by mixing. A mixture in which the dyeing agent is dissolved in the organic solvent in advance and the silicone compound may be added in the same organic solvent or different organic solvents. A mixture in which the silicone compound is dissolved in the organic solvent in advance and the dyeing agent may be added to the same organic solvent or different organic solvents. These mixing orders can be appropriately selected in consideration of solubility of the silicone compound and the dyeing agent. When the dyeing agent and the silicone compound are dispersed or dissolved in different organic solvents, the organic solvents may be the same or different, and both of the organic solvents are preferably organic solvents having a surface tension of less than 70 dyn/cm.

[Step (ii)]

In the step (ii), the coating solution prepared in the step (i) is caused to pass through the inner surface of the hollow fiber membrane (the inner surface of the hollow fiber membrane is brought into contact with the coating solution prepared in the step (i)) to form the coating layer containing the silicone compound and/or the crosslinked product of the silicone compound (silicone compound/crosslinked product) and the dyeing agent on the inner surface.

Here, as the hollow fiber membrane, a hollow fiber membrane generally known for use in an oxygenator can be used. Therefore, the hollow fiber membrane can be used in a form of an oxygenator having a plurality of porous hollow fiber membranes for gas exchange. In the form of the oxygenator, each of the hollow fiber membranes has an inner surface forming a lumen and an outer surface, a coating layer containing a silicone compound (a silicone compound used for preparing the coating solution and/or a crosslinked product of the silicone compound) formed on the inner surface, and a coat containing an antithrombotic polymer compound formed on the outer surface. Here, as the antithrombotic polymer compound, known antithrombotic polymer compounds described in JPS57-039851A, JPS63-154180A, U.S. Pat. No. 5,298,255, JPH04-152952A, JP2018-149270A, and the like can be similarly used as long as it has an antithrombotic property and biocompatibility. A method of forming the coating film containing the antithrombotic polymer compound on the outer surface is not particularly limited, and a known method can be applied similarly or appropriately modified.

An oxygenator including the hollow fiber membrane will be described in detail below with reference to the drawings.

Figure 2:
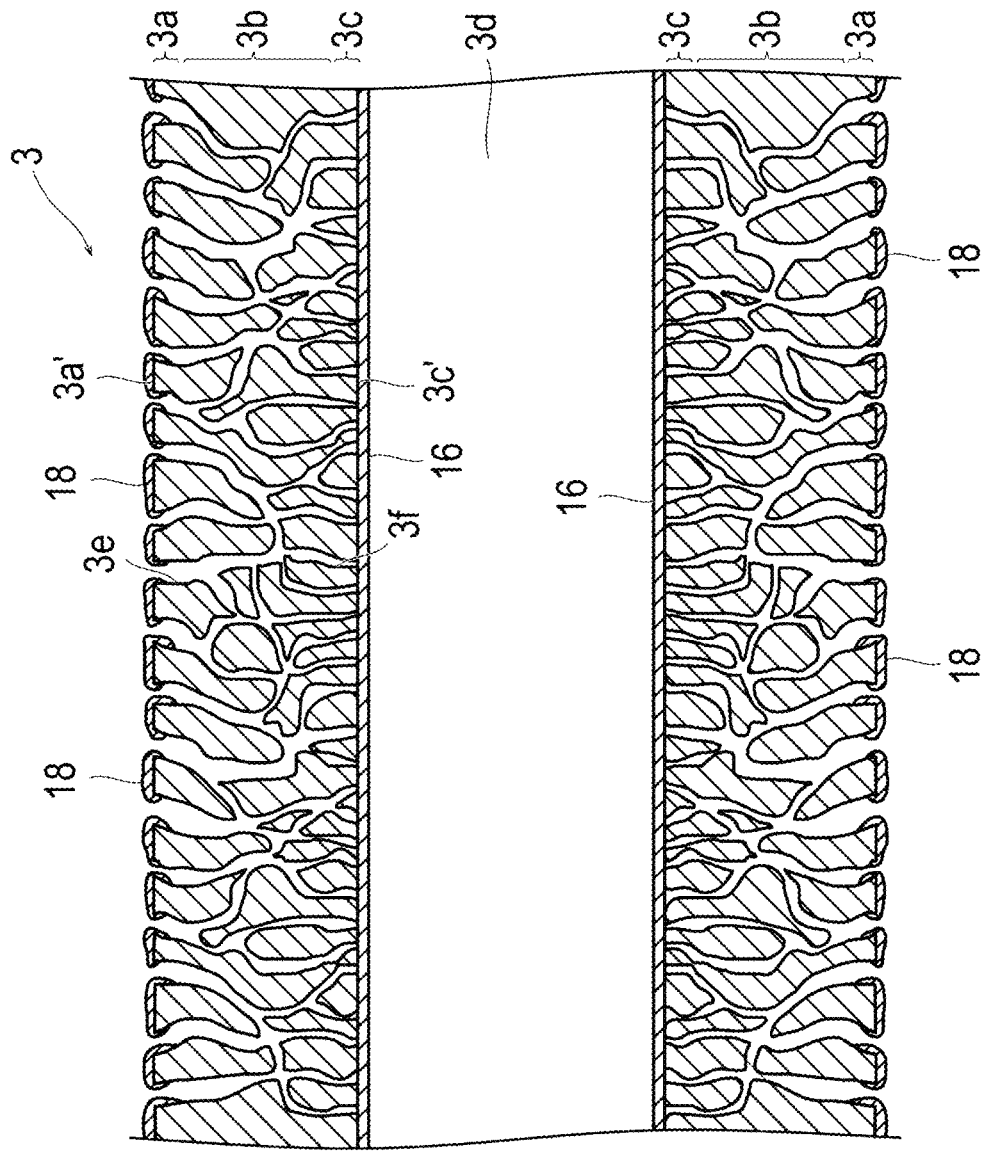
FIG. 2 is an enlarged cross-sectional view of the porous hollow fiber membrane for gas exchange used in the hollow fiber membrane external perfusion type oxygenator according to the embodiment of the invention.

FIG. 1 is a cross-sectional view of a hollow fiber membrane external perfusion type oxygenator according to an embodiment of the invention. In FIG. 1, reference numeral 1 denotes the hollow fiber membrane external perfusion type oxygenator, reference numeral 2 denotes a housing, reference numeral 3 denotes a porous hollow fiber membrane for gas exchange, reference numerals 4 and 5 denote partition walls, reference numeral 6 denotes a blood inflow port, reference numeral 7 denotes a blood outflow port, reference numeral 8 denotes a gas inflow port, reference numeral 9 denotes a gas outflow port, reference numeral 10 denotes a gas-inflow-side header, reference numeral 11 denotes a gas-outflow-side header, reference numeral 12 denotes a blood chamber, reference numeral 13 denotes a gas inflow chamber, and reference numeral 14 denotes a gas outflow chamber. FIG. 2 is an enlarged cross-sectional view of the porous hollow fiber membrane for gas exchange used in the hollow fiber membrane external perfusion type oxygenator according to the embodiment of the invention. In FIG. 2, reference numeral 3 denotes a porous hollow fiber membrane for gas exchange, reference numeral 3a denotes an outer layer, reference numeral 3a' denotes an outer surface, reference numeral 3b denotes a middle layer, reference numeral 3c denotes an inner layer, reference numeral 3c' denotes an inner surface, reference numeral 3d denotes a passage (lumen), reference numeral 3e denotes an opening on an outer surface side, reference numeral 3f denotes an opening on an inner surface side, reference numeral 16 denotes coating layers, and reference numeral 18 denotes coats. In the present specification, the hollow fiber membrane external perfusion type oxygenator is also simply referred to as a "hollow fiber membrane type oxygenator" or an "oxygenator". In the present specification, the porous hollow fiber membrane for gas exchange is also simply referred to as a "porous hollow fiber membrane" or a "hollow fiber membrane".

In the embodiment shown in FIG. 1, in a hollow fiber membrane external perfusion type oxygenator 1, a large number of porous hollow fiber membranes for gas exchange 3 are housed in a housing 2. As shown in FIG. 2, the hollow fiber membranes 3 each include a passage (lumen) 3d in which a gas chamber is formed at a center. In addition, the hollow fiber membranes 3 each have openings 3e and 3f through which an outer surface 3a' communicates with an inner surface 3c'. A coating layer 16 containing a silicone compound or the like is formed on the inner surface 3c' of the hollow fiber membranes 3 through which an oxygen-containing gas flows. A coat 18 containing an antithrombotic polymer compound is formed on the outer surface 3a' (in some cases, the outer surface 3a' and an outer layer 3a) of the hollow fiber membranes 3 serving as a blood contact portion. The coating layer 16 may contain other components in addition to the silicone compound or the like. Here, the other components are not particularly limited, and examples thereof include polyolefins, aliphatic hydrocarbons, inorganic fine particles, and crosslinkers. Preferably, the coating layer 16 is made of only the silicone compound or the like. Similarly, the coat 18 may contain other components in addition to the antithrombotic polymer compound. Here, the other components are not particularly limited, and examples thereof include other antithrombotic compounds (for example, heparin), crosslinkers, thickeners, preservatives, and pH adjusters.

The coating layer 16 containing the silicone compound or the like may be formed on at least a part of the inner surface 3c' of the hollow fiber membranes 3 through which the oxygen-containing gas flows, and is preferably formed on the entire inner surface 3c' from a viewpoint of maintaining a gas exchange performance in long-term use (a blood plasma leakage resistance improving effect and a wet lung reducing effect) or the like. In the embodiment shown in FIG. 2, the coating layer 16 containing the silicone compound or the like is formed to close the openings 3f of pores on an inner surface 3c' side over the entire inner surface 3c', but has high gas permeability, and can thus have a sufficient gas exchange performance. In addition, the coating layer 16 containing the silicone compound or the like may be present in an inner layer 3c (in some cases, the inner layer 3c and a middle layer 3b) of the hollow fiber membranes 3.

Similarly, the coat 18 containing the antithrombotic polymer compound may be formed on at least a part of the outer surface 3a' of the hollow fiber membranes 3 serving as the blood contact portion, and is preferably formed on the entire outer surface 3a' from a viewpoint of the antithrombotic property, biocompatibility (a platelet adhesion/attachment reducing and prevention effect and a platelet activation reducing and prevention effect) or the like. In the embodiment shown in FIG. 2, the coat 18 containing the antithrombotic polymer compound may be present in the middle layer 3b (in some cases, the middle layer 3b and the inner layer 3c) of the hollow fiber membranes 3, and is preferably substantially absent in the middle layer 3b (in some cases, the middle layer 3b and the inner layer 3c) of the hollow fiber membranes 3. Since the antithrombotic polymer compound is substantially absent, the middle layer 3b or the inner layer 3c of the hollow fiber membrane 3 maintains a hydrophobic property of a base material of the membrane, which can effectively prevent leakage of a blood plasma component. In the present specification, the expression "the coat 18 containing the antithrombotic polymer compound is substantially absent in the middle layer 3b (in some cases, the middle layer 3b and the inner layer 3c) of the hollow fiber membranes 3" means that permeation of the antithrombotic polymer compound is not observed around the inner surface 3c' of the hollow fiber membranes 3 (a surface on a side where the oxygen-containing gas flows).

The hollow fiber membrane type oxygenator 1 according to the present embodiment includes the housing 2 having a blood inflow port 6 and a blood outflow port 7, a hollow fiber membrane bundle including a large number of porous hollow fiber membranes for gas exchange 3 housed in the housing 2, a pair of partition walls 4 and 5 that support both end portions of the hollow fiber membrane bundle in the housing 2 in a liquid-tight manner, a blood chamber 12 formed between the partition walls 4 and 5, an inner surface of the housing 2 and an outer surface of the hollow fiber membranes 3, a gas chamber formed inside the hollow fiber membranes 3, and a gas inflow port 8 and a gas outflow port 9 that communicate with the gas chamber.

Specifically, the hollow fiber membrane type oxygenator 1 according to the present embodiment includes the tubular housing 2, an aggregate of the hollow fiber membranes for gas exchange 3 housed in the tubular housing 2, and the partition walls 4 and 5 that support both end portions of the hollow fiber membranes 3 in the housing 2 in a liquid-tight manner. An interior of the tubular housing 2 is partitioned into the blood chamber 12 as a first fluid chamber and the gas chamber as a second fluid chamber, and the tubular housing 2 is provided with the blood inflow port 6 and the blood outflow port 7 which communicate with the blood chamber 12.

A cap-shaped gas-inflow-side header 10 having the gas inflow port 8 as a second fluid inflow port communicating with the gas chamber, which is an internal space of the hollow fiber membranes 3, is attached above the partition wall 4 which is an end portion of the tubular housing 2. Accordingly, a gas inflow chamber 13 is formed by an outer surface of the partition wall 4 and an inner surface of the gas-inflow-side header 10. The gas inflow chamber 13 communicates with the gas chamber formed in an internal space of the hollow fiber membranes 3.

Similarly, a cap-shaped gas-outflow-side header 11 having the gas outflow port 9 as a second fluid outflow port communicating with the internal space of the hollow fiber membranes 3 is attached below the partition wall 5. Accordingly, a gas outflow chamber 14 is formed by an outer surface of the partition wall 5 and an inner surface of the gas-outflow-side header 11.

The hollow fiber membrane 3 is a porous membrane made of a hydrophobic polymer material, is a hollow fiber membrane same as that used in a known oxygenator, and is not particularly limited. In this way, when the hollow fiber membrane (in particular, the inner surface of the hollow fiber membrane) is made of a hydrophobic polymer material, leakage of the blood plasma component can be reduced. As a material used for the porous membrane, a hydrophobic polymer material same as that of the hollow fiber membrane used for the known oxygenator can be used. Specifically, examples of the material include a polyolefin resin such as a polypropylene, a polyethylene, and polymethylpentene, and a polymer material such as polysulfone, polyacrylonitrile, polytetrafluoroethylene, and cellulose acetate. Among these, a polyolefin resin is preferably used, a polypropylene and polymethylpentene are more preferable, and a polypropylene is still more preferable. That is, according to a preferred embodiment of the invention, at least a part of the hollow fiber membranes (preferably all the hollow fiber membranes) are formed of a polyolefin resin. In a more preferred embodiment of the invention, at least a part of the hollow fiber membranes (preferably all the hollow fiber membranes) are formed of a polypropylene or polymethylpentene. In a still more preferred embodiment of the invention, at least a part of the hollow fiber membranes (preferably all the hollow fiber membranes) are formed of a polypropylene.

An inner diameter of the hollow fiber membrane is not particularly limited, and is preferably 50 μm to 300 μm, and more preferably 80 μm to 200 μm. An outer diameter of the hollow fiber membrane is not particularly limited, and is preferably 100 μm to 400 μm, and more preferably 130 μm to 200 μm. A thickness (membrane thickness) of the hollow fiber membrane is preferably 20 μm or more and less than 50 μm, more preferably 25 μm or more and less than 50 μm, still more preferably 25 μm to 45 μm, even more preferably 25 μm to 40 μm, even still more preferably 25 μm to 35 μm, and particularly preferably 25 μm to 30 μm. In the present specification, the "thickness (membrane thickness) of the hollow fiber membrane" means a thickness between the inner surface and the outer surface of the hollow fiber membrane, and is expressed by a formula: [(outer diameter of hollow fiber membrane)−(inner diameter of hollow fiber membrane)]/2. By setting a lower limit of the thickness of the hollow fiber membrane as described above, a strength of the hollow fiber membrane can be sufficiently ensured. Further, it is also satisfactory in terms of a trouble and a cost in manufacturing, which is also preferable from a viewpoint of mass production. A porosity of the hollow fiber membrane is preferably 5 vol % to 90 vol %, more preferably 10 vol % to 80 vol %, and particularly preferably 30 vol % to 60 vol %. A pore diameter of the hollow fiber membrane is preferably 0.01 μm to 5 μm, and more preferably 0.05 μm to 1 μm. A method for manufacturing the hollow fiber membrane is not particularly limited and may be similar to a known method for manufacturing a hollow fiber membrane or the known method that is suitably modified. For example, the hollow fiber membrane is preferably obtained by forming micropores in a wall by a stretching method or a solid-liquid phase separation method.

In the present specification, the "pore diameter of the hollow fiber membrane" refers to an average diameter of openings on a side covered with the antithrombotic polymer compound (outer surface side). The pore diameter of the hollow fiber membrane can be measured by the following method.

First, a side (outer surface) of the hollow fiber membrane covered with the antithrombotic polymer compound is imaged with a scanning electron microscope (SEM). Next, an obtained SEM image is subjected to image processing to reassign pores (openings) for white and the other portions for black, and the number of pixels of the white portion is measured. A binarization boundary level is set to an intermediate value of a difference between the whitest portion and the blackest portion.

Subsequently, the number of pixels of the pores (openings) displayed in white is counted. A pore area is calculated based on the number of the pixels of each pore obtained in this manner and a degree of image resolution (μm/pixel) of the SEM image. Based on the obtained pore area, a diameter of each pore is calculated assuming that the pore is circular, a statistically significant number, for example, diameters of 500 pores are randomly extracted, and an arithmetic average diameter of the pores is referred to as the "pore diameter of the hollow fiber membrane".

The tubular housing 2 can be made of a material same as that used for a housing of the known oxygenator. Specifically, examples of the material include a hydrophobic synthetic resin such as a polycarbonate, an acryl-styrene copolymer, and an acryl-butylene-styrene copolymer. The housing 2 is not particularly limited in shape and has, for example, a cylindrical shape, and is preferably a transparent body. Forming a transparent body makes it possible to easily check the inside of the housing.

The quantity of the hollow fiber membranes housed in the present embodiment is not particularly limited and may be similar to that in the known oxygenator. For example, about 5,000 to 100,000 porous hollow fiber membranes 3 are housed in the housing 2 in parallel in an axial direction. Further, the hollow fiber membranes 3 are fixed to both ends of the housing 2 in a liquid-tight state by the partition walls 4 and 5 in a state in which both ends of the hollow fiber membranes 3 are open. The partition walls 4 and 5 are formed of a potting agent such as a polyurethane and a silicone rubber. A portion sandwiched between the partition walls 4 and 5 in the housing 2 is divided into the gas chamber inside the hollow fiber membranes 3 and the blood chamber 12 outside the hollow fiber membranes 3.

In the present embodiment, the gas-inflow-side header 10 having the gas inflow port 8 and the gas-outflow-side header 11 having the gas outflow port 9 are attached to the housing 2 in a liquid-tight manner. These headers may be formed of any material, and may be formed of, for example, the hydrophobic synthetic resin used for the housing. The headers may be attached by any method, and for example, the headers are attached to the housing 2 by fusion using an ultrasound, a high frequency, induction heating, or the like, by adhesion using an adhesive, or by mechanical fitting. Alternatively, a fastening ring (not shown) may be used. It is preferable that the entire blood contact portion (the inner surface of the housing 2 and the outer surface of the hollow fiber membranes 3) of the hollow fiber membrane type oxygenator 1 is formed of a hydrophobic material.

In the present embodiment, a cover (coat) of the antithrombotic polymer compound is selectively formed on the outer surface of the hollow fiber membrane (of external perfusion type). Therefore, blood (in particular, a blood plasma component) does not easily permeate the pores in the hollow fiber membrane, or does not permeate the pores. Hence, the leakage of the blood (in particular, the blood plasma component) from the hollow fiber membrane can be effectively reduced or prevented. In particular, when the antithrombotic polymer compound is not substantially present in the middle layer 3b of the hollow fiber membrane 3 and the inner layer 3c of the hollow fiber membrane 3, the middle layer 3b of the hollow fiber membrane 3 and the inner layer 3c of the hollow fiber membrane 3 maintain a hydrophobic state of a material, and thus severe leakage of blood (in particular, the blood plasma component) can be more effectively reduced or prevented. Therefore, the oxygenator obtained by the method according to the invention can maintain a high gas exchange performance over a long time.

The cover of the antithrombotic polymer compound according to the present embodiment is essentially formed on the outer surface of the hollow fiber membrane of the oxygenator, or may be formed on other components (for example, the entire blood contact portion) in addition to the outer surface. With this configuration, it is possible to more effectively reduce or prevent platelet adhesion/attachment and activation in the entire blood contact portion of the oxygenator. Since a contact angle of a blood contact surface is reduced, a priming operation is facilitated. In this case, it is preferable that the cover of the antithrombotic polymer compound according to the invention is formed on the other components with which blood comes into contact, but the antithrombotic polymer compound may not be covered on the hollow fiber membrane other than the blood contact portion or other portions (for example, portions buried in the partition walls) of the hollow fiber membrane. Such portions do not come into contact with blood, and thus do not cause any particular problem even if not covered with the antithrombotic polymer compound.

Figure 3:
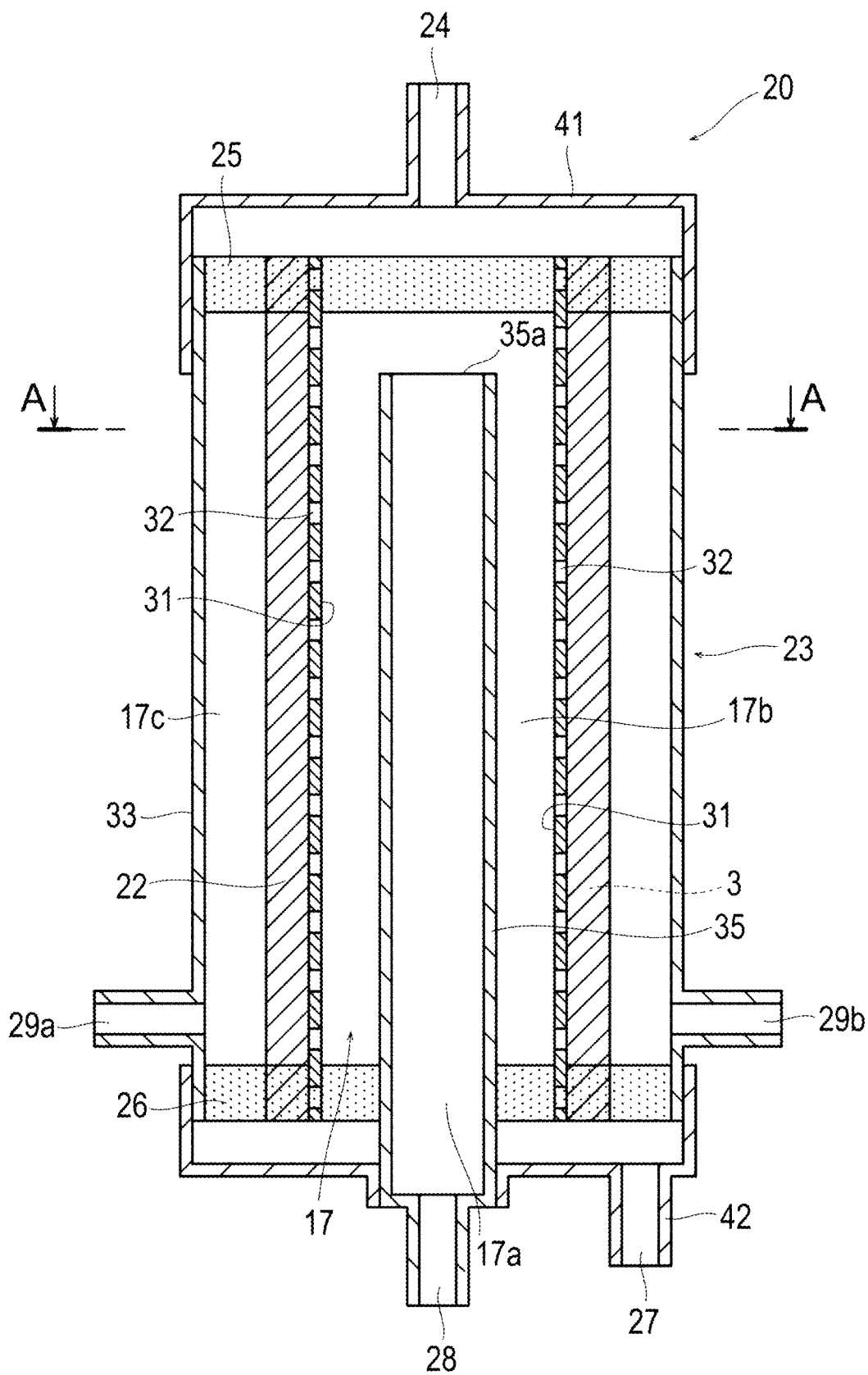
FIG. 3 is a cross-sectional view of a hollow fiber membrane external perfusion type oxygenator according to another embodiment of the invention.
Figure 4:
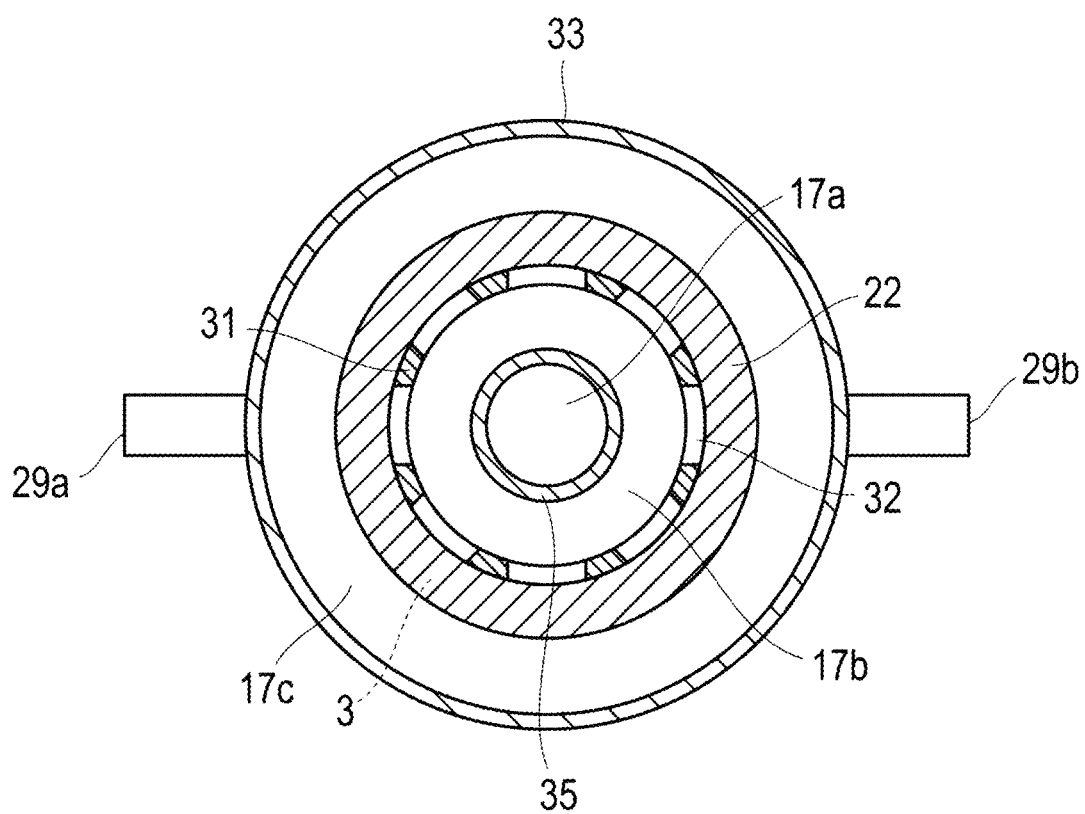
FIG. 4 is a cross-sectional view taken along a line A-A in FIG. 3.

The oxygenator obtained by the method according to the invention may be of a type shown in FIG. 3. FIG. 3 is a cross-sectional view showing another embodiment of the oxygenator obtained by the method according to the invention. In FIG. 3, reference numeral 20 denotes the hollow fiber membrane external perfusion type oxygenator, reference numeral 3 denotes the porous hollow fiber membrane for gas exchange, reference numeral 17 denotes a blood chamber, reference numerals 17a and 28 denote blood inflow ports, reference numeral 17b denotes a first blood chamber, reference numeral 17c denotes a second blood chamber, reference numeral 22 denotes a tubular hollow fiber membrane bundle, reference numeral 23 denotes a housing, reference numeral 24 denotes a gas inflow port, reference numeral 25 denotes a first partition wall, reference numeral 26 denotes a second partition wall, reference numeral 27 denotes a gas outflow port, reference numerals 29a and 29b denote blood outflow ports, reference numeral 31 denotes an inner tubular member, reference numeral 32 denotes a blood flow opening, reference numeral 33 denotes an outer tubular member, reference numeral 35 denotes an inner tubular body, reference numeral 41 denotes a gas inflow member, and reference numeral 42 denotes a gas outflow member. FIG. 4 is a cross-sectional view taken along a line A-A in FIG. 3. In FIG. 4, reference numeral 3 denotes the porous hollow fiber membrane for gas exchange, reference numeral 17a denotes the blood inflow port, reference numeral 17b denotes the first blood chamber, reference numeral 17c denotes the second blood chamber, reference numeral 22 denotes the tubular hollow fiber membrane bundle, reference numerals 29a and 29b denote the blood outflow ports, reference numeral 31 denotes the inner tubular member, reference numeral 32 denotes the blood flow opening, reference numeral 33 denotes the outer tubular member, and reference numeral 35 denotes the inner tubular body.

In FIG. 3, an oxygenator (hollow fiber membrane external perfusion type oxygenator) 20 includes an inner tubular member 31 having blood flow openings 32 on a side surface thereof, a tubular hollow fiber membrane bundle 22 including a large number of porous hollow fiber membranes for gas exchange 3 wound around an outer surface of the inner tubular member 31, a housing 23 that houses the tubular hollow fiber membrane bundle 22 together with the inner tubular member 31, partition walls 25 and 26 that fix both end portions of the tubular hollow fiber membrane bundle 22 to the housing 23 in a state in which both end portions of the hollow fiber membranes 3 are open, a blood inflow port 28 and blood outflow ports 29a and 29b that communicate with a blood chamber 17 formed in the housing 23, and a gas inflow port 24 and a gas outflow port 27 that communicate with inside of the hollow fiber membranes 3.

As shown in FIGS. 3 and 4, in the oxygenator 20 according to the present embodiment, the housing 23 includes an outer tubular member 33 in which the inner tubular member 31 is housed, the tubular hollow fiber membrane bundle 22 is housed between the inner tubular member 31 and the outer tubular member 33, and the housing 23 further includes one of a blood inflow port and a blood outflow port communicating with inside of the inner tubular member 31, and the other of a blood inflow port and a blood outflow port communicating with inside of the outer tubular member 33.

Specifically, in the oxygenator 20 according to the present embodiment, the housing 23 includes an inner tubular body 35 that is housed in the outer tubular member 33 and the inner tubular member 31 and that has a distal end opening in the inner tubular member 31. The blood inflow port 28 is formed at one end (lower end) of the inner tubular body 35, and the two blood outflow ports 29a and 29b extending outward are formed on a side surface of the outer tubular member 33. The number of the blood outflow ports may be one or more.

The tubular hollow fiber membrane bundle 22 is wound around the outer surface of the inner tubular member 31. That is, the inner tubular member 31 serves as a core of the tubular hollow fiber membrane bundle 22. The inner tubular body 35 housed inside the inner tubular member 31 has a distal end portion open near the first partition wall 25. The blood inflow port 28 is formed at a lower end portion protruding from the inner tubular member 31.

The inner tubular body 35, the inner tubular member 31 around which the hollow fiber membrane bundle 22 is wound, and the outer tubular member 33 are substantially concentrically disposed. Due to the first partition wall 25, one end (upper end) of the inner tubular member 31 around which the hollow fiber membrane bundle 22 is wound and one end (upper end) of the outer tubular member 33 maintain a concentric positional relation therebetween and are in a liquid-tight state in which the inside of the inner tubular member 31 and a space formed between the outer tubular member 33 and the outer surface of the hollow fiber membranes 3 do not communicate with the outside.

Due to the second partition wall 26, portions of the inner tubular body 35 slightly above the blood inflow port 28, that is, the other end (lower end) of the inner tubular member 31 around which the hollow fiber membrane bundle 22 is wound and the other end (lower end) of the outer tubular member 33, maintain a concentric positional relation therebetween and are in a liquid-tight state in which a space formed between the inner tubular body 35 and the inner tubular member 31 and a space formed between the outer tubular member 33 and the outer surface of the hollow fiber membranes 3 do not communicate with the outside. The partition walls 25 and 26 are formed of a potting agent such as a polyurethane and a silicone rubber.

The oxygenator 20 according to the present embodiment includes a blood inflow port 17a formed inside the inner tubular body 35, a first blood chamber 17b formed between the inner tubular body 35 and the inner tubular member 31 and having a substantially tubular space, and a second blood chamber 17c formed between the hollow fiber membrane bundle 22 and the outer tubular member 33 and having a substantially tubular space, and the blood chamber 17 is formed by these components.

Blood that has flowed in from the blood inflow port 28 flows into the blood inflow port 17a, rises in the inner tubular body 35 (blood inflow port 17a), flows out from an upper end 35a (opening end) of the inner tubular body 35, flows into the first blood chamber 17b, passes through the openings 32 formed in the inner tubular member 31, comes into contact with the hollow fiber membranes 3, performs gas exchange, flows into the second blood chamber 17c, and flows out from the blood outflow ports 29a and 29b.

A gas inflow member 41 having the gas inflow port 24 is fixed to one end of the outer tubular member 33, and similarly, a gas outflow member 42 having the gas outflow port 27 is fixed to the other end of the outer tubular member 33. The blood inflow port 28 of the inner tubular body 35 protrudes outward through the gas outflow member 42.

The outer tubular member 33 is not particularly limited, and may be, for example, a cylindrical body, a polygonal tubular member, or a member having an elliptical cross-section. A cylindrical body is preferable. An inner diameter of the outer tubular member 33 is not particularly limited, may be the same as an inner diameter of an outer tubular member used in the known oxygenator, and is preferably about 32 mm to 164 mm. An effective length of the outer tubular member 33 (among the entire length, a length of a portion that is not buried in the partition walls) is also not particularly limited, may be the same as an effective length of the outer tubular member used in the known oxygenator, and is preferably about 10 mm to 730 mm.

The inner tubular member 31 is not particularly limited in shape and may be, for example, a cylindrical body, a polygonal tubular member, or a member having an elliptical cross-section. A cylindrical body is preferable. An outer diameter of the inner tubular member 31 is not particularly limited, may be the same as an outer diameter of an inner tubular member used in the known oxygenator, and is preferably about 20 mm to 100 mm. An effective length of the inner tubular member 31 (among the entire length, a length of a portion of that is not buried in the partition walls) is also not particularly limited, may be the same as an effective length of the inner tubular member used in the known oxygenator, and is preferably about 10 mm to 730 mm.

Figure 5:
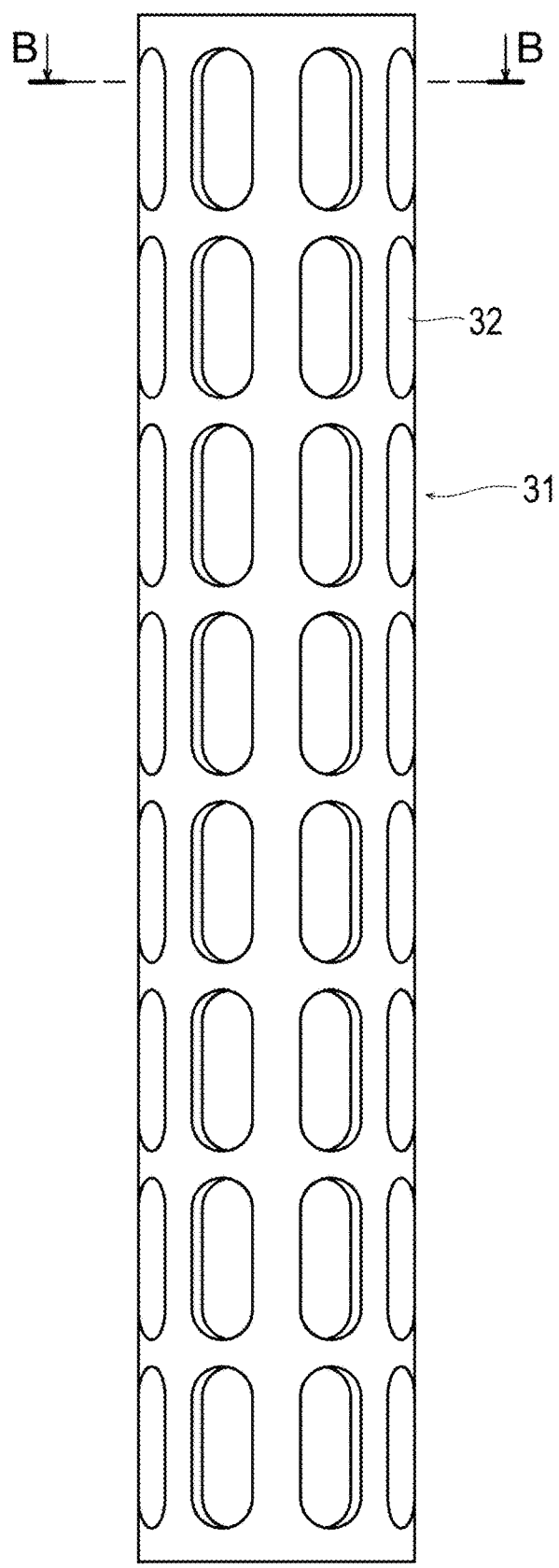
FIG. 5 is a front view showing an example of the inner tubular member used in the hollow fiber membrane external perfusion type oxygenator according to the invention.
Figure 6:
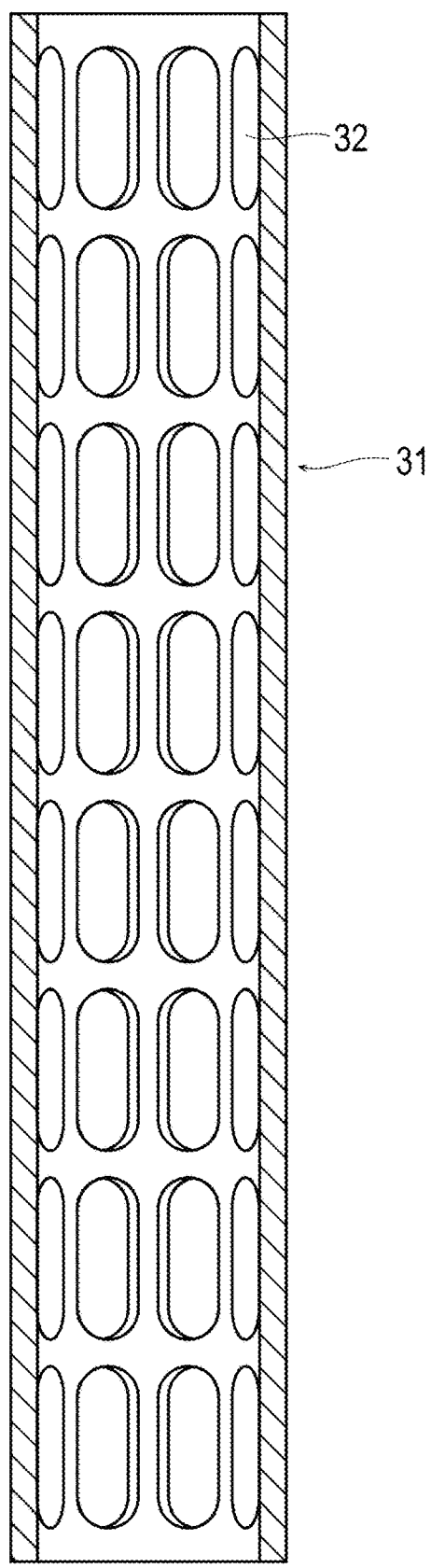
FIG. 6 is a central longitudinal cross-sectional view of the inner tubular member shown in FIG. 5.
Figure 7:
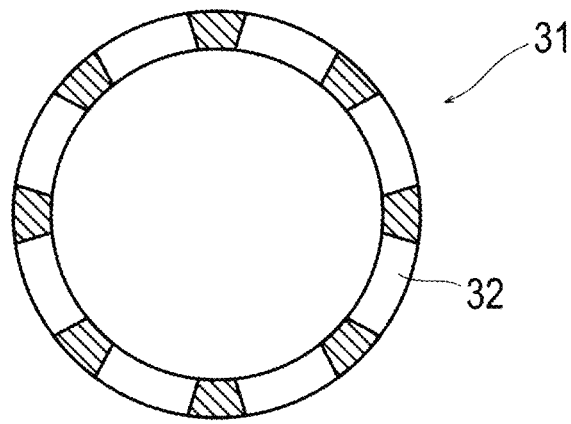
FIG. 7 is a cross-sectional view taken along a line B-B in FIG. 5.

The inner tubular member 31 includes a large number of the blood flow openings 32 on the side surface thereof. Regarding a size of the openings 32, a total area is preferably large as long as a required strength of the tubular member is maintained. For example, as shown in FIG. 5 which is a front view, FIG. 6 which is a central longitudinal cross-sectional view of FIG. 5, and FIG. 7 which is a cross-sectional view taken along a line B-B in FIG. 5, in order to satisfy such a condition, it is preferable to provide a plurality of sets (8 sets/circumference in the drawings) of annular arrangement openings, in which a plurality of (for example, 4 to 24 openings, and 8 openings in the longitudinal direction in the drawing) openings 32 are provided at equal angular intervals on the circumference surface of the tubular member, in an axial direction of the tubular member. Further, the opening may be shaped into a circle, polygon, or ellipse, and is preferably shaped into an oval as shown in FIG. 5.

The inner tubular body 35 is not particularly limited in shape, and may be, for example, a cylindrical body, a polygonal tubular member, or a member having an elliptical cross-section. A cylindrical body is preferable. A distance between a distal end opening of the inner tubular body 35 and the first partition wall 25 is not particularly limited, may be a distance same as that used in the known oxygenator, and is preferably about 20 mm to 50 mm. An inner diameter of the inner tubular body 35 is not particularly limited, may be the same as an inner diameter of an inner tubular body used in the known oxygenator, and is preferably about 10 mm to 30 mm.

A thickness of the tubular hollow fiber membrane bundle 22 is not particularly limited, may be the same as a thickness of a tubular hollow fiber membrane bundle used in the known oxygenator, is preferably 5 mm to 35 mm, and particularly preferably 10 mm to 28 mm. A filling rate of the hollow fiber membrane with respect to a tubular space formed between an outer side surface and an inner side surface of the tubular hollow fiber membrane bundle 22 is also not particularly limited, may be a filling rate in the known oxygenator, is preferably 40% to 85%, and particularly preferably 45% to 80%. The outer diameter of the hollow fiber membrane bundle 22 may be the same as an outer diameter of a hollow fiber membrane bundle used in the known oxygenator, is preferably 30 mm to 170 mm, and particularly preferably 70 mm to 130 mm. Such a configuration is employed as a gas exchange membrane.

The hollow fiber membrane bundle 22 can be formed by winding the hollow fiber membrane around the inner tubular member 31, and specifically, by forming a hollow fiber membrane bobbin using the inner tubular member 31 as a core, fixing both ends of the formed hollow fiber membrane bobbin by a partition wall, and then cutting the both ends of the hollow fiber membrane bobbin and the inner tubular member 31 as the core. By this cutting, the hollow fiber membrane opens on an outer surface of the partition wall. A method for forming the hollow fiber membrane is not limited to the method described above, and may be similar to another known method for forming the hollow fiber membrane or the known method that is suitably modified.

In particular, it is preferable to wind one hollow fiber membrane or to wind a plurality of hollow fiber membranes simultaneously around the inner tubular member 31 in such a manner that substantially parallel and adjacent hollow fiber membranes are spaced at substantially constant intervals. Accordingly, an uneven flow of the blood can be reduced more effectively. A distance between the hollow fiber membranes adjacent to each other is not limited to the following, and is preferably 1/10 to 1/1 of the outer diameter of the hollow fiber membrane. Further, the distance between the hollow fiber membranes adjacent to each other is preferably 30 μm to 200 μm.

Further, the hollow fiber membrane bundle 22 is formed by winding one hollow fiber membrane or winding a plurality of (preferably 2 to 16) hollow fiber membranes simultaneously around the inner tubular member 31 in such a manner that all adjacent hollow fiber membranes have a substantially constant interval, and is preferably formed by winding the hollow fiber membranes around the inner tubular member 31 by operating a rotator for rotating the inner tubular member 31 and a winder for weaving the hollow fiber membranes under conditions of the following Equation (1) when winding the hollow fiber membranes around the inner tubular member.

Traverse [mm/lot]·$n$(integer)=traverse winding width·2±(fiber outer diameter+interval)·number of winding fibers         Equation (1):

By satisfying the above conditions, formation of the uneven flow of the blood can be further reduced. A value of "n" in Equation (1), that is, a relation between the number of rotations of the winding rotator and the number of reciprocations of the winder, is not particularly limited, and is typically 1 to 5, and preferably 2 to 4.

As shown in FIG. 2, in the hollow fiber membrane type oxygenator 20, the coating layer 16 containing the silicone compound or the like is also formed on the inner surface $3c'$ of the hollow fiber membranes 3 through which the oxygen-containing gas flows. The coat 18 containing the antithrombotic polymer compound is formed on the outer surface $3a'$ (in some cases, the outer surface $3a'$ and the outer layer $3a$) of the hollow fiber membranes 3 serving as the blood contact portion. Here, a preferred form (an inner diameter, an outer diameter, a thickness, a porosity, a pore diameter of a pore, and the like) of the hollow fiber membranes is not particularly limited, and may be a form similar to that described in FIG. 1.

In the step, the inner surface of the hollow fiber membrane (or hollow fiber membrane of the oxygenator; the same applies hereinafter) is brought into contact with the coating solution, and a method of bringing the inner surface of the hollow fiber membrane into contact with the coating solution is not particularly limited as long as the coating solution can pass through the lumen of the hollow fiber membrane. From a viewpoint of ease of the coating solution passing through the lumen of the hollow fiber membrane, it is preferable to bring the inner surface of the hollow fiber membrane into contact with the coating solution (to cause the coating solution to pass through the lumen of the hollow fiber membrane) under a negative pressure of 50 hPa or more and 150 hPa or less. The step may include other operations as necessary.

When the coating solution passes through the inner surface of the hollow fiber membrane, the lumen of the hollow fiber membrane is set to a negative pressure of 50 hPa or more and 150 hPa or less, and preferably a negative pressure of 50 hPa or more and 100 hPa or less. A method of setting the negative pressure is not particularly limited, and for example, the negative pressure can be set by airtightly connecting a vacuum pump (for example, a diaphragm pump) and one end of the hollow fiber membrane and operating the vacuum pump. As described in Examples below, a value of a displayed pressure in the vacuum pump is adopted as an atmospheric pressure.

In this way, the coating solution is caused to pass through the inner surface of the hollow fiber membrane (the inner surface of the hollow fiber membrane is brought into contact with the coating solution) in a state in which the lumen of the hollow fiber membrane is under a predetermined negative pressure. A method of the coating solution passing (a method of being in contact with the coating solution) is not particularly limited, and examples of the method include a method of pouring the coating solution from the other end (an end not connected to the vacuum pump) of the hollow fiber membrane connected to the vacuum pump. According to the method, the coating solution comes into contact with the inner surface of the hollow fiber membrane by moving to the end on a side to which the vacuum pump is connected. A passing time of the coating solution (a contact time between the inner surface of the hollow fiber membrane and the coating solution) is not particularly limited, and is preferably 5 s to 180 s, more preferably 15 s to 120 s, and still more preferably 30 s to 60 s.

The amount of the coating solution to be brought into contact with the inner surface of the hollow fiber membrane (a passing amount of the coating solution) is preferably 10 $L/m^2$ to 10,000 $mL/m^2$, more preferably 30 $L/m^2$ to 1000 $mL/m^2$, and still more preferably 40 $L/m^2$ to 200 $mL/m^2$ per membrane area from a viewpoint of forming a coating layer having a desired thickness.

Thereafter, the organic solvent contained in the coating film is dried as necessary. A drying method is not particularly limited, and examples thereof include methods such as reduced-pressure drying and high-temperature drying under a normal pressure. A drying temperature in the high-temperature drying is preferably 45° C. to 80° C. A drying time in the high-temperature drying is preferably 1 h to 48 h. A drying device used in the step may be a generally used device, and examples thereof include an oven and a hot air dryer. A plurality of such drying devices can be used in combination.

A membrane thickness of the coating layer after drying is not particularly limited, and is preferably 0.1 μm to 10 μm, more preferably 0.5 μm to 7 μm, and still more preferably 1 μm to 5 μm. When the membrane thickness of the coating layer is 0.1 μm or more, sufficient blood plasma leakage resistance is obtained. When the membrane thickness of the coating layer is 10 μm or less, a decrease in the gas exchange performance can be prevented.

A solution passing operation (the operation of bringing the inner surface of the hollow fiber membrane into contact with the coating solution, preferably the operation of bringing the inner surface of the hollow fiber membrane into contact with the coating solution under a negative pressure of 50 hPa or more and 150 hPa or less) may be performed only one time or a plurality of times. As described above, when the concentration of the silicone compound in the coating solution is low, the coating layer having a sufficient thickness can be formed by performing the operation a plurality of times. When the operation is performed a plurality of times, it is preferable that a cycle of drying the organic solvent after the operation is set as one cycle and the cycle is repeated a plurality of times. The number of times of the operation in the case in which the above operation is performed a plurality of times is not particularly limited, and is preferably 2 times to 5 times, more preferably 2 times to 4 times, and still more preferably 2 times or 3 times.

[Step (iii)]

In the step (iii), the dyed state of the hollow fiber membrane end surface 1 on the coating solution passing start side and the dyed state of the hollow fiber membrane end surface 2 on the coating solution passing end side of the hollow fiber membrane on which the coating layer is formed in the step (ii) described above are observed, and a covering state of the silicone compound/the crosslinked product is evaluated.

In the step (ii) described above, the coating solution containing the silicone compound and the dyeing agent is caused to pass through the lumen of the hollow fiber membrane. At this time, both the silicone compound and the dyeing agent are uniformly present in the coating solution. That is, since the silicone compound or the like and the dyeing agent are similarly present in the lumen of the hollow fiber membrane after the coating solution passing (that is, the silicone compound is also present in a place on which the dyeing agent is present), a dyed hollow fiber membrane portion can be regarded as corresponding to a position at which a coat made of the silicone compound or the like is formed. Hence, in the hollow fiber membrane in which the entire hollow fiber membrane end surface 2 on the coating solution passing end side is dyed, it can be determined that the coat made of the silicone compound or the like is formed on the entire inner surface of the hollow fiber membrane. Since all the hollow fiber membranes on the coating solution passing start side are in contact with the coating solution, the number of hollow fiber membranes in which the hollow fiber membrane end surface 1 on the coating solution passing start side is dyed corresponds to the number of all the hollow fiber membranes. A ratio (hereinafter, also simply referred to as a "dyeing ratio") of the number of hollow fiber membranes in which the hollow fiber membrane end surface 2 (preferably an entire cross-sectional surface of the hollow fiber membrane on the end surface) on the coating solution passing end side is dyed to the total number of the hollow fiber membranes (the number of the hollow fiber membranes in which the hollow fiber membrane end surface 1 (preferably an entire cross-sectional surface of the hollow fiber membrane on the end surface) on the coating solution passing start side is dyed) can be set as an index for evaluating the formation state of the coating layer containing the silicone compound or the like (determining pass or fail of a product). Here, the dyeing ratio can be appropriately (for example, 90% or more, more than 95%, or 99% or more) set by a manufacturer according to a required performance of the oxygenator (hollow fiber membranes). In the step, the ratio of the number of the hollow fiber membranes in which the hollow fiber membrane end surface 2 on the coating solution passing end side is dyed to the number of the hollow fiber membranes (all the hollow fiber membranes) in which the hollow fiber membrane end surface 1 on the coating solution passing start side is dyed can be set as the index. Since the hollow fiber membrane end surface 1 on the coating solution passing start side is in direct contact with the coating solution, substantially all the hollow fiber membranes are dyed with the dyeing agent. On the other hand, the hollow fiber membrane end surface 2 on the coating solution passing end side is a portion through which the coating solution can completely pass in a longitudinal direction of the hollow fiber membrane. Therefore, the covering state of the coating layer on the entire lumen of the hollow fiber membranes can be evaluated by setting the hollow fiber membranes in which the hollow fiber membrane end surface 1 on the coating solution passing start side is dyed and the hollow fiber membranes in which the hollow fiber membrane end surface 2 on the coating solution passing end side is dyed as objects to be counted.

A method of counting the number of the hollow fiber membranes in which the hollow fiber membrane end surface 2 on the coating solution passing end side is dyed is not particularly limited. Specifically, portions apart by 0.5 mm to 3 mm from the hollow fiber membrane end surface 1 on the coating solution passing start side and the hollow fiber membrane end surface 2 on the coating solution passing end side of the hollow fiber membranes are cut, followed by slicing at a width of 0.5 mm to 3 mm from a newly exposed end surface to prepare hollow fiber membrane slices (samples) on the coating solution passing start side and the coating solution passing end side. Next, for these hollow fiber membrane slices (samples), the number of the hollow fiber membranes dyed (preferably, whose entire cross-sectional surface of the hollow fiber membranes is dyed), is counted under visible light, and if necessary by using, a microscope (the number of dyed hollow fiber membranes on the coating solution passing start side=A; the number of dyed hollow fiber membranes on the coating solution passing end side=B). A value obtained by dividing the number (B) of the dyed hollow fiber membranes on the coating solution passing end side by the number (A) of the dyed hollow fiber membranes on the coating solution passing start side is expressed in percentage (B×100/A (%)), and the ratio may be used as an index. Alternatively, a value obtained by dividing the number (B) of the dyed hollow fiber membranes on the coating solution passing end side by the number (A') of all the hollow fiber membranes is expressed by percentage (B×100/A' (%)), and the ratio may be used as an index. "B×100/A (%)" and "B×100/A' (%)" described above are substantially the same. Alternatively, when the dyeing agent is a fluorochrome, the hollow fiber membrane slices (samples) are irradiated with light having a predetermined wavelength (for example, green excitation light at 550 nm in a case of Rhodamine B), if necessary, after observation under the visible light, and the number of hollow fiber membranes that generate fluorescence (preferably, on the entire cross-sectional surface of the hollow fiber membrane) is counted (the number of fluorescent hollow fiber membranes on the coating solution passing start side=$X_1$; the number of fluorescent hollow fiber membranes on the coating solution passing end side=$Y_1$). A value obtained by dividing the number ($Y_1$) of the fluorescent hollow fiber membranes on the coating solution passing end side by the number ($X_1$) of the fluorescent hollow fiber membranes on the coating solution passing start side is expressed in percentage ($Y_1 \times 100/X_1$ (%)), and the ratio may be used as an index. Alternatively, a value obtained by dividing the number ($Y_1$) of the fluorescent hollow fiber membranes on the coating solution passing end side by the number (X') of all the hollow fiber membranes is expressed by percentage ($Y_1 \times 100/X'$ (%)), and the ratio may be used as an index. "$Y_1 \times 100/X_1$ (%)" and "$Y_1 \times 100/X'$ (%)" described above are substantially the same. Alternatively, when the dyeing agent is a fluorochrome, if necessary, after the fluorescence is generated in the same manner as described above, an image under the fluorescence is binarized, a binarized image contrast is obtained by luminance threshold setting, and the number of the hollow fiber membranes dyed is counted by black circular ring counting based on the binarized image contrast (the number of the dyed hollow fiber membranes on the coating solution passing start side=$X_2$; the number of the dyed hollow fiber membranes on the coating solution passing end side=$Y_2$). A value obtained by dividing the number ($Y_2$) of the dyed hollow fiber membranes on the coating solution passing end side by the number ($X_2$) of the dyed hollow fiber membranes on the coating solution passing start side is expressed in percentage ($Y_2 \times 100/X_2$ (%)), and the ratio may be used as an index. Alternatively, a value obtained by dividing the number ($Y_2$) of the dyed hollow fiber membranes on the coating solution passing end side by the number (X') of all the hollow fiber membranes is expressed by percentage ($Y_2 \times 100/X'$ (%)), and the ratio may be used as an index. "$Y_2 \times 100/X_2$ (%)" and "$Y_2 \times 100/X'$ (%)" described above are substantially the same.

By the method described above, the formation state of the coating layer containing the silicone compound or the like (the covering state of the silicone compound or the like) on the inner surface of the hollow fiber membranes can be easily evaluated.

EXAMPLES

The effects of the invention will be described using the following examples. However, a technical scope of the invention is not limited to the following examples. In the following examples, unless otherwise specified, an operation is performed at room temperature (25° C.). Unless otherwise specified, "%" and "parts" mean "mass %" and "parts by mass", respectively.

Examples 1 and 2 and Comparative Example 1

(Hollow Fiber Membrane Preparation)

Figure 8:
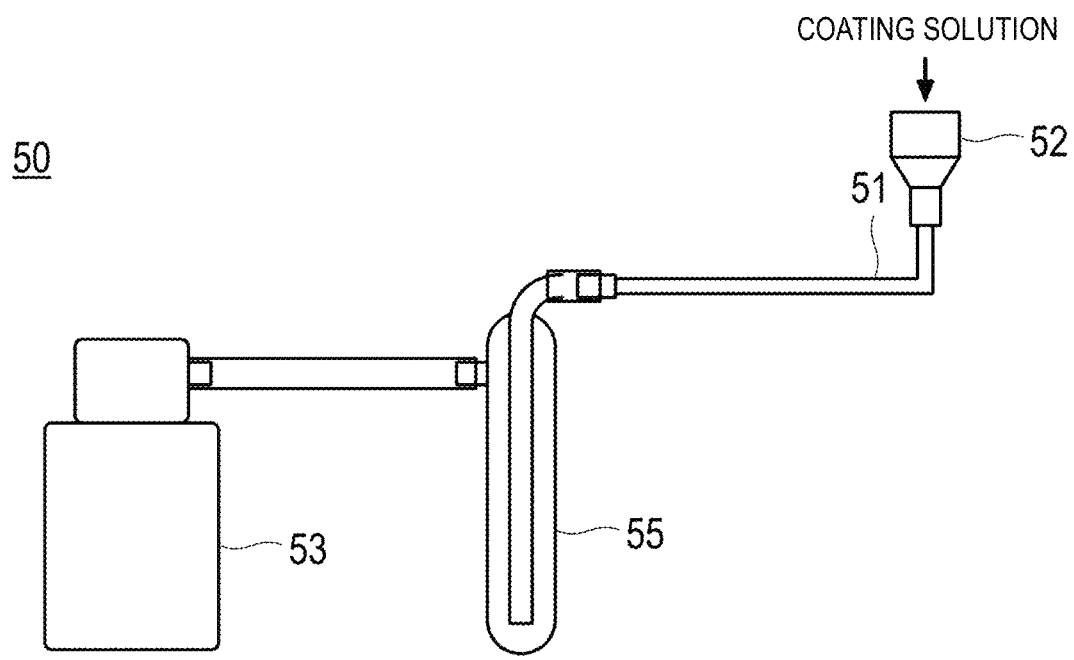
FIG. 8 is a circuit diagram used for forming a coating layer in a lumen of a hollow fiber membrane in Examples 1 to 2 and Comparative Example 1.

As shown in FIG. 8, a circuit 50 was assembled by connecting a liquid injection port 52 to one end of a porous hollow fiber membrane 51 made of a polypropylene (outer diameter: 170 μm, inner diameter: 112 μm, thickness: 29 μm, pore diameter: 0.05 μm, porosity: 30 vol %, total number: 300, membrane area: 0.05 m$^2$) and connecting a diaphragm pump 53 to the other end thereof.

(Coating Solution Preparation)

Rhodamine B (dyeing agent) was dissolved in acetone to have a concentration of 10 mg/mL to prepare a dyeing solution (saturated solution).

Polydimethylsiloxane (vinyl-terminated PDMS, SYLGARD® 184) (silicone compound) was added to and dissolved in n-hexane (surface tension: 18.4 dyn/cm) to have a concentration of 100 mg/mL, and the dyeing solution prepared above was added to and dissolved in n-hexane to have a concentration of Rhodamine B of 0.075 mg/mL, thereby preparing a coating solution (1) (Example 1). In the coating solution (1), the silicone compound and Rhodamine B were uniformly dispersed. Polydimethylsiloxane (vinyl-terminated PDMS, SYLGARD® 184) has a structure represented by the above Formula (1) in which $R^1$, $R^3$, $R^4$, $R^5$, $R^6$, and $R^8$ are methyl groups, and $R^2$ and $R^7$ are vinyloxy groups (—O—CH=CH$_2$).

Polydimethylsiloxane (vinyl-terminated PDMS, SYLGARD® 184) (silicone compound) was added to and dissolved in n-hexane (surface tension: 18.4 dyn/cm) to have a concentration of 200 mg/mL and the dyeing solution prepared above was added to and dissolved in n-hexane to have a concentration of Rhodamine B of 0.075 mg/mL, thereby preparing a coating solution (2) (Example 2). In the coating solution (2), the silicone compound and Rhodamine B were uniformly dispersed.

Polydimethylsiloxane (vinyl-terminated PDMS, SYLGARD® 184) (silicone compound) was added to and dissolved in n-hexane (surface tension: 18.4 dyn/cm) to have a concentration of 100 mg/mL, thereby preparing a coating solution (3) (Comparative Example 1). In the coating solution (3), the silicone compound was uniformly dispersed.

(Coating Layer Formation)

In the circuit 50 in FIG. 8, each of the coating solutions (1) to (3) prepared above was poured into the liquid injection port 52, and a pressure was reduced such that a displayed pressure in the diaphragm pump 53 was 50 hPa. Accordingly, the lumen of the hollow fiber membrane 51 was set to a negative pressure of 50 hPa, and each coating solution was caused to pass through the lumen over 30 seconds. The coating solution after the solution passing was collected by a trap 55. As described above, the coating solutions (1) to (3) were applied to the lumen of the hollow fiber membrane 51 in an amount of 40 mL/m² per membrane area.

After the solution passing, the hollow fiber membrane 51 was removed from the circuit, and the hollow fiber membrane was left in an oven at 60° C. for 12 h to dry the solvent remaining in the lumen of the hollow fiber membrane and a crosslinking reaction on the silicone compound was performed, thereby obtaining hollow fiber membranes (1) to (3) having a coating layer having a membrane thickness of 4 μm.

Figure 9:
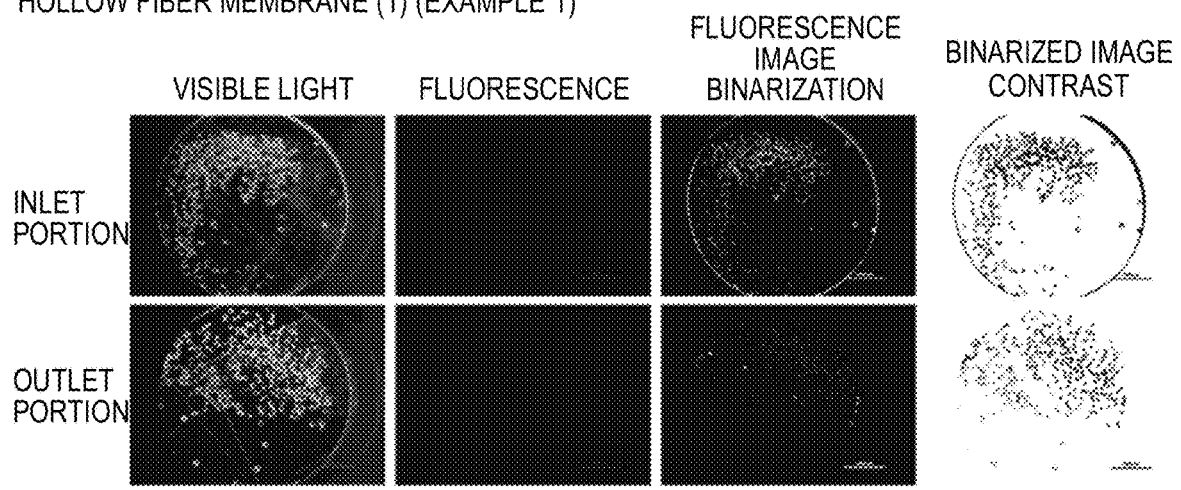
FIG. 9 shows an image (color image) under visible light, an image (color image) under green excitation irradiation, a binarized image, and a binarized image contrast of each of inlet portion samples and outlet portion samples in Example 1 and Comparative Example 1.
Figure 9:
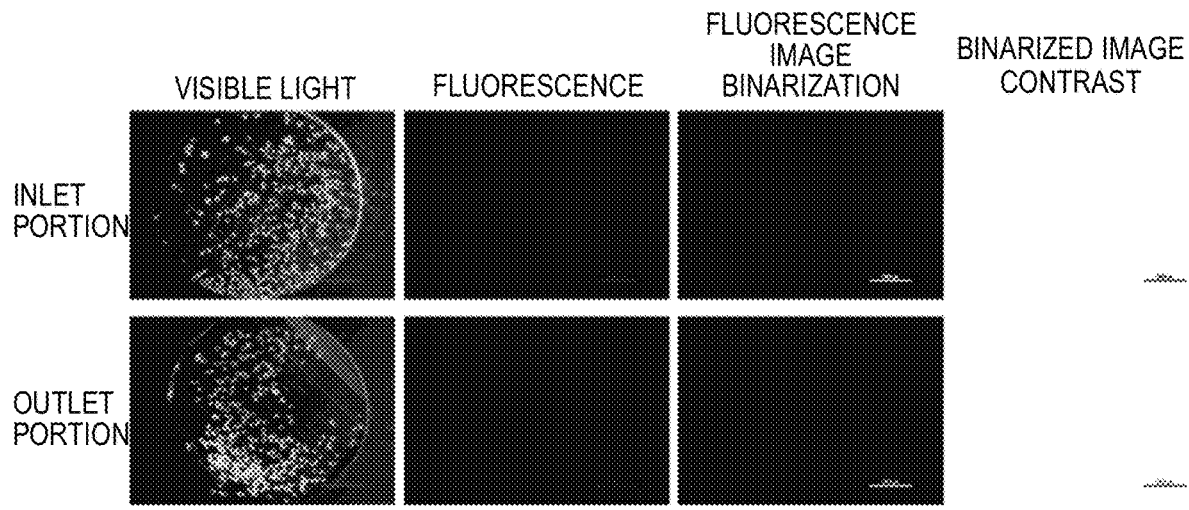

A portion apart by 1 mm from both end surfaces of each of the obtained hollow fiber membranes (1) to (3) was cut, followed by slicing at a width of 1 mm from a newly exposed end surface to prepare a slice (inlet portion sample) on a coating solution injection portion (inlet portion) side and a slice (outlet portion sample) on a coating solution outflow portion (outlet portion) side. These samples (inlet portion sample and outlet portion sample) were observed under visible light. A result is shown in FIG. 9 (visible light). In addition, green excitation light (wavelength: 550 nm) was emitted to these inlet portion sample and outlet portion sample in a dark room and the presence or absence of fluorescence was checked. A result is shown in FIG. 9 (fluorescence). Next, the image under fluorescence obtained above was binarized (fluorescence image binarization in FIG. 9), and the binarized image contrast was obtained by luminance threshold setting (binarized image contrast in FIG. 9).

Regarding the hollow fiber membranes (1) and (2), by respectively counting the number of black circular rings based on the binarized image contrast of the outlet portion sample, the number of the hollow fiber membranes in which the entire cross-section of the coating solution outflow portion (outlet portion) of the hollow fiber membranes was dyed was counted as ($X_1$), the ($X_1$) was divided by the number ($X_0$) of the hollow fiber membranes in which the entire cross-section of the coating solution inflow portion (inlet portion) of the hollow fiber membranes was dyed, and a percentage of the number ($X_1$) of the hollow fiber membranes in which the entire coating solution outflow portion side was dyed to the number ($X_0$) of all hollow fiber membranes implementing the hollow fiber membrane ($X_1 \times 100/X_0$ (%), $X_1/X_0$ ratio) was obtained. As a result, the $X_1/X_0$ ratio of the hollow fiber membrane (1) was 100%, and the $X_1/X_0$ ratio of the hollow fiber membrane (2) was lower than the $X_1/X_0$ ratio of the hollow fiber membrane (1). In the coating solution inflow portions (inlet portions) of the hollow fiber membranes (1) and (2), the entire cross-sections of all the hollow fiber membranes were dyed.

Rhodamine B and the silicone compound were uniformly dispersed in the coating solutions (1) and (2). Therefore, since the silicone compound also passes throughout up to the coating solution outflow portion as Rhodamine B, it can be determined that the coat made of the silicone compound or the like is formed on the entire lumen of the hollow fiber membrane in the hollow fiber membrane in which the entire cross-section of the coating solution outflow portion is dyed. From the above consideration, it can be determined that, in the hollow fiber membrane (1), all the hollow fiber membranes were dyed up to the coating solution outflow portion, and thus the coat made of the silicone compound or the like is formed over the entire lumen of the hollow fiber membrane (pass). On the other hand, it can be determined that, in the hollow fiber membrane (2), dyeing of a part of the hollow fiber membranes is not observed, and there is coating unevenness (there is a hollow fiber membrane in which the coat made of the silicone compound or the like is formed only In a part of the lumen; fail). From these results, the $X_1/X_0$ ratio can be set as an index for evaluating a covering state of the silicone compound or the like (pass or fail of a product).

On the other hand, as shown in FIG. 9, the hollow fiber membrane of the hollow fiber membrane (3) through which the coating solution (3) containing only the silicone compound has passed is not visualized at both end surfaces of the hollow fiber membrane under irradiation of the green excitation light (the fluorescence image binarization is not obtained). Therefore, it was impossible or very difficult to determine whether the coat made of the silicone compound was formed in the lumen of the hollow fiber membrane.

From the above results, the method according to the invention is an effective index for determining whether the coat made of the silicone compound or the like is formed in the lumen of the hollow fiber membrane, and the index is expected to be usable for determining the performance of the oxygenator.

What is claimed is:

1. A method for evaluating a covering state of a silicone compound on a hollow fiber membrane for treating blood in an oxygenator, comprising the steps of:
   dissolving a silicone compound and a dyeing agent in an organic solvent to prepare a coating solution;
   causing the coating solution to pass through an inner surface of a hollow fiber membrane to form a coating layer containing the silicone compound and/or a crosslinked product of the silicone compound and the dyeing agent on the inner surface; and
   evaluating a covering state of the silicone compound/the crosslinked product by observing a dyed state of a hollow fiber membrane end surface on a coating solution passing start side and a dyed state of a hollow fiber membrane end surface on a coating solution passing end side of the hollow fiber membrane on which the coating layer is formed.

2. The method according to claim 1, wherein the dyeing agent is selected from Rhodamine B, Rhodamine 6G, Rhodamine 6GP, Rhodamine 3GO, Rhodamine 123, fluorescein and a derivative thereof, and a polymer having these molecules in at least one of a side chain and a terminal.

3. The method according to claim 1, wherein a surface tension of the organic solvent is less than 70 dyn/cm.

4. The method according to claim 3, wherein the organic solvent is at least one selected from the group consisting of n-hexane, cyclohexane, acetone, butyl alcohol, 1-propanol, isopropanol, chloroform, diethyl ether, an aromatic hydrocarbon, and a fluorine-based solvent.

5. The method according to claim 1, wherein at least a part of the hollow fiber membrane is formed of a polypropylene or polymethylpentene.

6. The method according to claim 1, wherein the silicone compound is represented by the following Formula (1):

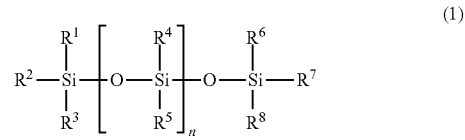

and wherein in the above Formula (1), $R^1$ to $R^8$ each independently represent an alkyl group having 1 or more and 6 or less carbon atoms, an aromatic hydrocarbon group having 6 or more and 30 or less carbon atoms, or a reactive group selected from the group consisting of an ethylenically unsaturated bond-containing group having 1 or more and 6 or less carbon atoms, an amino group-containing group, a hydroxy group-containing group, a carboxy group-containing group, a maleimide group-containing group, a thiol group-containing group, and a halogen group; and n is 1 or more and 100,000 or less.

7. A method for evaluating a covering state of a silicone compound on a bundle of a plurality of hollow fiber membranes for treating blood in an oxygenator, comprising the steps of:
dissolving a silicone compound and a dyeing agent in an organic solvent to prepare a coating solution;
causing the coating solution to pass through an inner surface of the hollow fiber membranes in the bundle to form a coating layer containing the silicone compound and/or a crosslinked product of the silicone compound and the dyeing agent on the inner surface; and
evaluating a covering state of the silicone compound/the crosslinked product of each hollow fiber membrane by observing a dyed state of a hollow fiber membrane end surface on a coating solution passing start side and a dyed state of a hollow fiber membrane end surface on a coating solution passing end side of the hollow fiber membrane on which the coating layer is formed;
counting a number of the hollow fiber membranes with the dyed state at their coating solution passing end side; and
calculating a dyeing ratio according to the number of hollow fiber membranes within the bundle which are dyed on the coating solution passing end side and a number of hollow fiber membranes dyed on the coating solution passing start side.

8. The method according to claim 7, further comprising the steps of:
determining a failure of the bundle of hollow fiber membranes when the calculated dyeing ratio is less than a predetermined percentage; and
determining a pass of the bundle of hollow fiber membranes when the calculated dyeing ratio is greater than the predetermined percentage.

9. The method according to claim 8, wherein the predetermined percentage is about 90%.

10. The method according to claim 8, wherein the predetermined percentage is about 95%.

11. The method according to claim 7, wherein the dyeing agent is selected from Rhodamine B, Rhodamine 6G, Rhodamine 6GP, Rhodamine 3GO, Rhodamine 123, fluorescein and a derivative thereof, and a polymer having these molecules in at least one of a side chain and a terminal.

12. The method according to claim 7, wherein a surface tension of the organic solvent is less than 70 dyn/cm.

13. The method according to claim 12, wherein the organic solvent is at least one selected from the group consisting of n-hexane, cyclohexane, acetone, butyl alcohol, 1-propanol, isopropanol, chloroform, diethyl ether, an aromatic hydrocarbon, and a fluorine-based solvent.

14. The method according to claim 7, wherein at least a part of the hollow fiber membranes is formed of a polypropylene or polymethylpentene.

15. The method according to claim 7, wherein the silicone compound is represented by the following Formula (1):

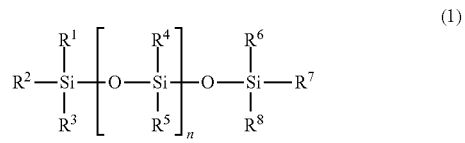

and wherein in the above Formula (1), $R^1$ to $R^8$ each independently represent an alkyl group having 1 or more and 6 or less carbon atoms, an aromatic hydrocarbon group having 6 or more and 30 or less carbon atoms, or a reactive group selected from the group consisting of an ethylenically unsaturated bond-containing group having 1 or more and 6 or less carbon atoms, an amino group-containing group, a hydroxy group-containing group, a carboxy group-containing group, a maleimide group-containing group, a thiol group-containing group, and a halogen group; and n is 1 or more and 100,000 or less.

* * * * *